US009065127B2

(12) United States Patent
Gottmann et al.

(10) Patent No.: US 9,065,127 B2
(45) Date of Patent: Jun. 23, 2015

(54) METHODS AND SYSTEMS FOR FUEL CELL STACK SINTERING AND CONDITIONING

(71) Applicant: Bloom Energy Corporation, Sunnyvale, CA (US)

(72) Inventors: Matthias Gottmann, Sunnyvale, CA (US); Nathan Ben Erlin, San Jose, CA (US); Kurt Risic, Mountain View, CA (US); Stephen Couse, Sunnyvale, CA (US); David Edmonston, Santa Cruz, CA (US)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 297 days.

(21) Appl. No.: 13/768,307

(22) Filed: Feb. 15, 2013

(65) Prior Publication Data
US 2013/0216927 A1 Aug. 22, 2013

Related U.S. Application Data

(60) Provisional application No. 61/600,171, filed on Feb. 17, 2012.

(51) Int. Cl.
H01M 8/04 (2006.01)
H01M 8/24 (2006.01)
H01M 8/00 (2006.01)
H01M 8/12 (2006.01)

(52) U.S. Cl.
CPC ........ *H01M 8/2465* (2013.01); *H01M 8/04559* (2013.01); *H01M 8/04589* (2013.01); *Y02E 60/50* (2013.01); *H01M 8/2425* (2013.01); *H01M 8/2475* (2013.01); *H01M 8/2485* (2013.01); *H01M 8/006* (2013.01); *H01M 2008/1293* (2013.01); *Y02E 60/525* (2013.01)

(58) Field of Classification Search
CPC ............ H01M 8/2465; H01M 8/0459; H01M 8/2425; H01M 8/2475; H01M 8/2485; H01M 8/04589; H01M 8/006; H01M 2008/1293
See application file for complete search history.

(56) References Cited

U.S. PATENT DOCUMENTS

| 5,492,778 | A |   | 2/1996 | Akagi |
| 5,558,948 | A | * | 9/1996 | Doyon .......................... 429/478 |
| 2003/0096147 | A1 | * | 5/2003 | Badding et al. ................. 429/30 |
| 2003/0228509 | A1 | * | 12/2003 | Taniguchi ........................ 429/33 |
| 2003/0235742 | A1 | * | 12/2003 | Bobrov et al. ................... 429/34 |

(Continued)

FOREIGN PATENT DOCUMENTS

JP 2007-280908 A 10/2007

OTHER PUBLICATIONS

International Search Report and Written Opinion received in connection with international application No. PCT/US2013/026328, mailed Jun. 3, 2013.

(Continued)

*Primary Examiner* — Kenneth Douyette
(74) *Attorney, Agent, or Firm* — The Marbury Law Group PLLC

(57) ABSTRACT

Systems and methods for sintering and conditioning fuel cell stacks utilizing channel guides, baffles, and internal compression systems are provided. Sintering and conditioning may be performed utilizing a fuel cell column cartridge assembly and fuel cell stacks may be sintered and conditioned at the system level during the same annealing cycle on the same support.

6 Claims, 26 Drawing Sheets

(56) References Cited

U.S. PATENT DOCUMENTS

| | | |
|---|---|---|
| 2005/0019637 A1* | 1/2005 | Herman et al. .................. 429/33 |
| 2005/0202293 A1* | 9/2005 | Kagami et al. ................... 429/24 |
| 2006/0257707 A1 | 11/2006 | Kaschmitter et al. |
| 2007/0196704 A1 | 8/2007 | Valensa et al. |
| 2009/0226795 A1 | 9/2009 | Chen et al. |
| 2010/0098978 A1 | 4/2010 | Hafemeister et al. |
| 2011/0076585 A1 | 3/2011 | Edmonston et al. |

OTHER PUBLICATIONS

International Preliminary Report on Patentability received in connection with international application No. PCT/US2013/026328, mailed Aug. 28, 2014.

Boutin, U.S. Appl. No. 61/511,308, filed Jul. 25, 2011.

U.S. Appl. No. 61/511,308, filed Jul. 25, 2011, Boutin.

* cited by examiner

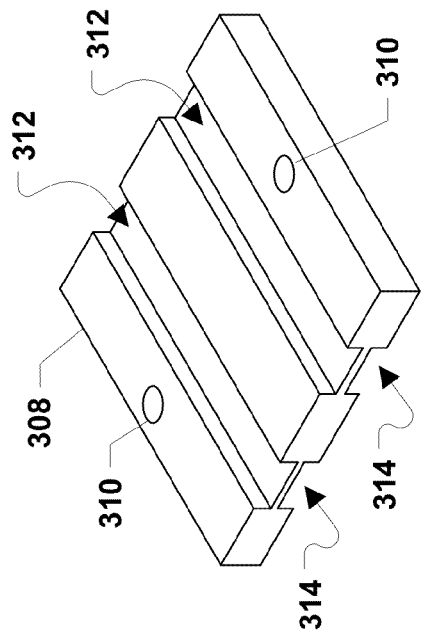
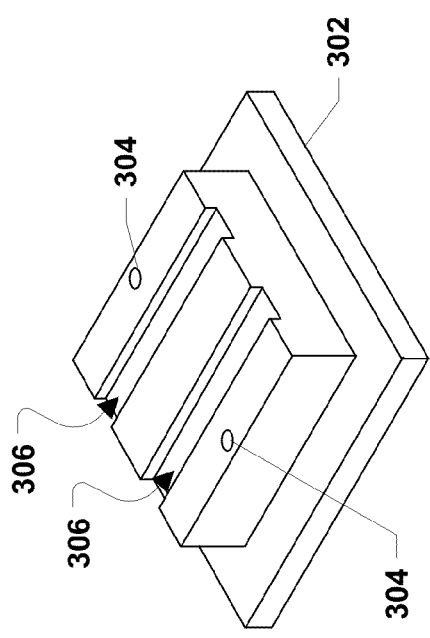
FIG. 3A
FIG. 3B

METHODS AND SYSTEMS FOR FUEL CELL STACK SINTERING AND CONDITIONING

RELATED APPLICATIONS

This application claims the benefit of priority of U.S. Provisional Patent Application No. 61/600,171 filed Feb. 17, 2012, entitled "Methods And Systems For Fuel Cell Stack Sintering And Conditioning", the entire contents of which are incorporated by reference herein.

FIELD

The present application is directed to fuel cell components and fuel cell sintering and condition methods and systems.

BACKGROUND

A single planar solid oxide fuel cell (SOFC) may consist of a solid electrolyte which has high oxygen ion conductivity, such as yttria stabilized zirconia (YSZ); a cathode material such as strontium-doped lanthanum manganite on one side of the electrolyte, which may be in contact with an oxidizing flow stream such as air; an anode material such as a cermet of nickel and YSZ on the opposing side of the electrolyte, which may be in contact with a fuel flow stream containing hydrogen, carbon monoxide, a gaseous hydrocarbon fuel. The flow channels containing electrically conductive interconnect plates are located on the exposed sides of the anode and cathode to provide the electrical connection between adjacent cells, and provide flow paths for the reactant (e.g., fuel and air) flow streams to contact the anode and cathode. Fuel cells may be combined into units called "stacks" in which the fuel cells may be electrically connected in series and separated by electrically conductive interconnects, such as gas separator plates which may function as interconnects. Glass seals are located between each cell and adjacent interconnects in the stack to keep the stack together and to keep fuel and air flows separate.

Fuel cells may be combined to form a stack in a linear array (configured horizontally or vertically) in which the component fuel cells may be electrically connected in series to obtain a higher voltage (as compared to the voltage output of a single cell). A fuel cell stack may contain conductive end plates on its ends. A generalization of a fuel cell stack may be the so-called fuel cell segment or column, which may contain one or more fuel cell stacks connected in series (e.g., where the end plate of one stack is connected electrically to an end plate of the next stack). A fuel cell segment or column may contain electrical leads which output the direct current from the segment or column to a power conditioning system. A fuel cell system may include one or more fuel cell columns, each of which may contain one or more fuel cell stacks, such as solid oxide fuel cell stacks.

SUMMARY

The embodiments of the invention provide a system and method for sintering and conditioning fuel cell stacks. An embodiment provides channel guides for fuel cell sintering and conditioning. Another embodiment provides channel guides with ceramic rods for fuel cell sintering and conditioning. A further embodiment provides baffles and internal compression systems for fuel cell sintering and conditioning. An additional embodiment provides a fuel cell column cartridge assembly for fuel cell sintering and conditioning. Further embodiments provide methods for sintering and conditioning fuel cells at the system level.

BRIEF DESCRIPTION OF THE DRAWINGS

FIG. 3A illustrates a perspective view of a manifold base according to an embodiment.

FIG. 3B illustrates a perspective view of a spacer manifold according to an embodiment.

DETAILED DESCRIPTION

Figure 1:
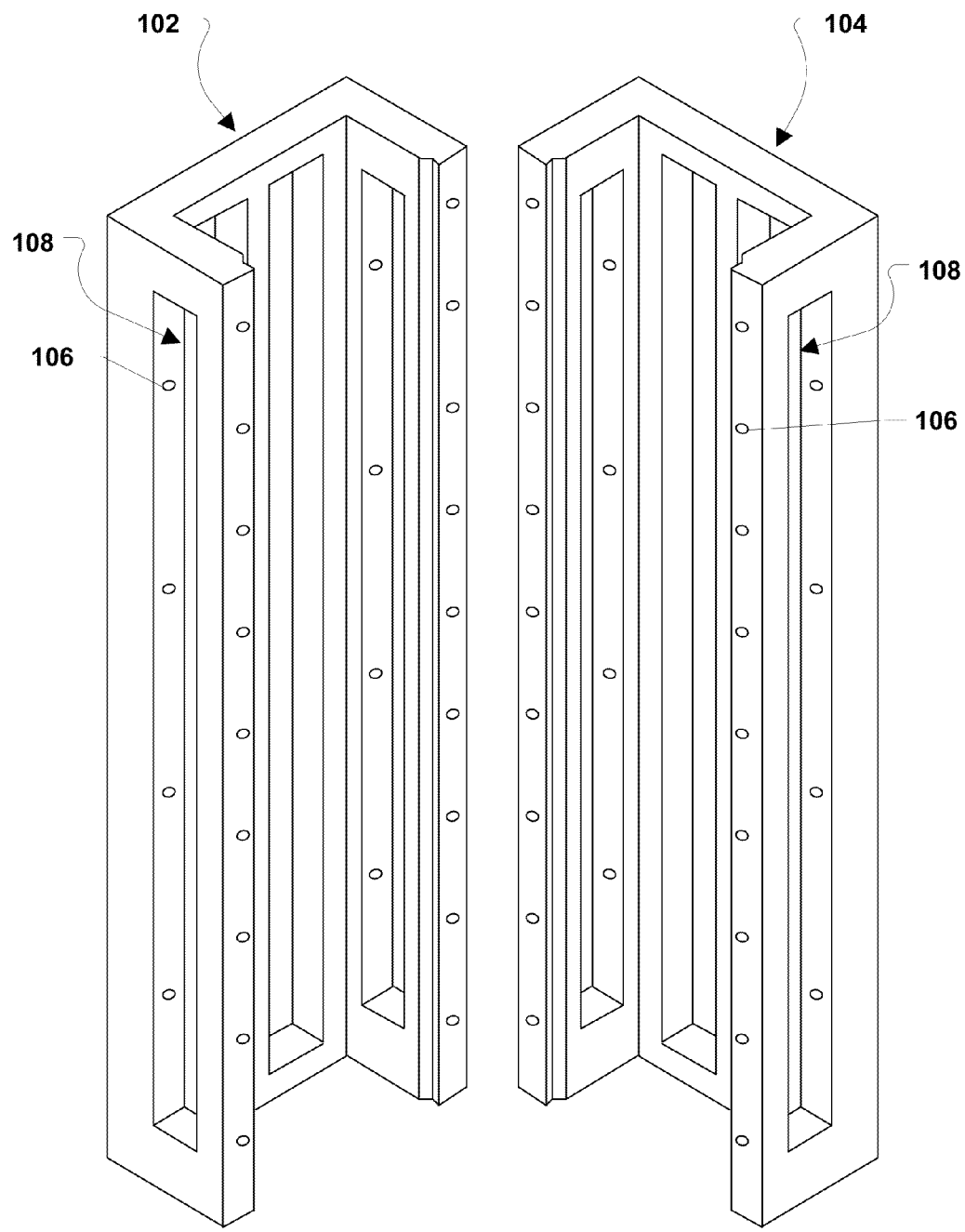
FIG. 1 illustrates a perspective view of channel guide rails according to an embodiment.

The embodiments of the invention illustrate systems and methods for sintering and conditioning fuel cell stacks. An embodiment provides channel guides for fuel cell sintering and conditioning. Additional embodiments provide channel guides with ceramic rods for fuel cell sintering and conditioning. Additional embodiments provide baffles and internal compression systems for fuel cell sintering and conditioning. Additional embodiments provide a fuel cell column cartridge assembly for fuel cell sintering and conditioning. Additional embodiments provide methods for sintering and conditioning fuel cells at the system level.

For purposes of this application "sintering" includes processes for heating, melting, and/or reflowing glass or glass-ceramic seal precursor material(s), such as glass or glass-ceramic forming powders and/or glass or glass-ceramic layers in the stack to form the glass or glass-ceramic seals between a fuel cell and two adjacent interconnects in the stack. Sintering may be performed at temperatures greater than 600 degrees Celsius, such as 600-1000 degrees Celsius, including 700-800 degrees Celsius, 800-900 degrees Celsius, 700-900 degrees Celsius, 900-950 degrees Celsius, and/or 950-1000 degrees Celsius. "Conditioning" includes processes for reducing a metal oxide (e.g., nickel oxide) in an anode electrode to a metal (e.g., nickel) in a cermet electrode (e.g., Ni-zirconia electrode, such as Ni-YSZ and/or Ni-scandia stabilized zirconia electrode, or Ni-doped ceria (e.g., scandia doped ceria) anode) and/or heating the stack during performance characterization/testing. Conditioning may be performed at temperatures from 750-900 degrees Celsius, such as 800-850 degrees Celsius, and may be performed with fuel and air flowing to respective cell anodes and cathodes. The sintering and conditioning processes may be conducted independently, in succession, or in any order. Preferably, the sintering and conditioning is performed on a fuel cell (e.g., SOFC) stack which is supported on the same support structure during both sintering and conditioning. These steps may be performed in the fuel cell system hot box or in a different location. A hot box may be a thermally insulated container in which the fuel cell stack(s) may be located. Additionally, the sintering and/or conditioning processes may be optional and not required for any given fuel cell stack.

Preferably, the sintering and the conditioning of the fuel cell stack are performed during the same thermal cycle. As used herein, "performing a process during the same thermal cycle" means the process is performed without cooling back to room temperature. Preferably, the sintering and the conditioning of the fuel cell stack are performed during the same thermal cycle (i.e., without cooling the fuel cell stack to room temperature between sintering and conditioning) while the fuel cell stack is located on and/or in the same support structure. The support structure may include a temporary base plate which supports the stack during sintering and/or conditioning and which is removed from the stack before the stack is placed on a hot box base in the hot box for operation (i.e., electricity generation). Alternatively, the support structure may include a portion of or an entire hot box base which is placed in the hot box and supports the fuel cell stack during operation (i.e., electricity generation).

FIG. 1 illustrates channel guide rails 102 and 104 according to one embodiment. Channel guide rail 102 may be a mirror image of channel guide rail 104. The channel guide rails 102 and 104 may be three sided assemblies with a series of holes 106 drilled laterally through two of the three sides. Additionally, the sides of the channel guide rails may be configured to create various cutouts 108 in each of the three sides. The cutouts 108 may be configured to accept fuel tree connections, air inputs, or other connection to be made to fuel cell stacks contained within the channel guide rails 102 and 104 as discussed further below. However, in an alternative embodiment in which internally manifolded for fuel and air fuel cell stack(s) may be contained within the channel guide rails 102 and 104, cutouts 108 may not be necessary. The channel guide rails 102 and 104 may be designed to constrain the fuel cell stacks (e.g., one stack or plural stacks in a column) during the sintering cycle and/or conditioning cycle. In this manner the fuel cell stack may be sintered and conditioned during the same thermal cycle. In an embodiment, the channel guide rails 102 and 104 may be used to constrain the fuel cell stacks during the sintering cycle and may be removed prior to a conditioning cycle. In an alternative embodiment the channel guide rails 102 and 104 may be used to constrain the fuel cell stacks during the sintering and conditioning cycles and may be removed prior to installation in the power generation system (e.g., in the fuel cell power generation system hot box). In another alternative embodiment the channel guide rails 102 and 104 may be used to constrain the fuel cell stacks during the sintering and conditioning cycles and may remain with the fuel cell stacks at installation in the power generation system (e.g., used in the closed hot box during system operation to generate power).

Channel guide rails 102 and 104 may be comprised of any suitable ceramic materials, such as aluminum oxide $Al_2O_3$ (i.e., alumina). The channel guide rails 102 and 104 may be substantially comprised of alumina, such as 97% alumina. Alternatively, the channel guide rails 102 and 104 may be comprised of less than 97% pure alumina, or more than 97% pure alumina, such as 97% to 98%, 98% to 99%, 99% to 99.5%, 99.5% to 100%, such as about 97%, about 98%, about 99%, or about 100%. Channel guide rails 102 and 104 comprised of alumina may not yield at high temperatures, such as 800-950 degrees Celsius. Channel guide rails 102 and 104 comprised of alumina may not short the fuel cell stacks because alumina is not electrically conductive. Alumina may lend itself to tight machining tolerances which may allow control over maximum stack tilt. In a 40 stack yield test, the result for channel guide rails 102 and 104 comprised of 97% pure alumina was 100%, prescribed maximum tilt was less than 0.5 mm, and there were no cracked cells.

Figure 2:
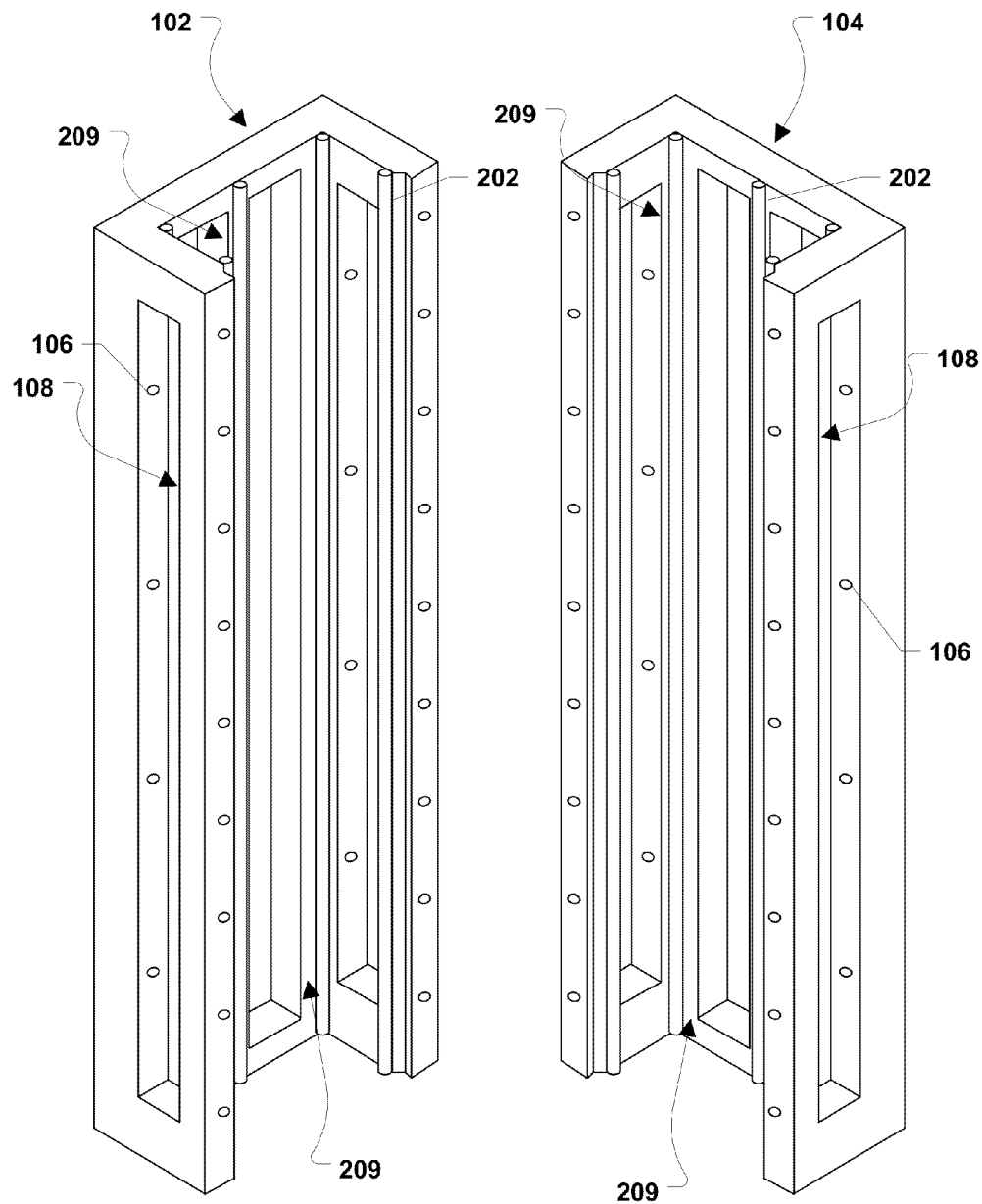
FIG. 2 illustrates a perspective view of channel guide rails with ceramic rods according to an embodiment.

FIG. 2 illustrates channel guide rails 102 and 104 with technical ceramic rods 202 according to another embodiment. The technical ceramic rods 202 may be coupled to the interior walls of the channel guide rails 102 and 104. The technical ceramic rods 202 may be comprised of alumina, such as 97% pure alumina. Alternatively, the technical ceramic rods 202 may be comprised of less than 97% pure alumina, or more than 97% pure alumina, such as 97% to 98%, 98% to 99%, 99% to 99.5%, 99.5% to 100%, such as about 97%, about 98%, about 99%, or about 100%. In an embodiment, the technical ceramic rods 202 may be created from powder pressed to form the technical ceramic rods 202 while the channel guides rails 102 and 104 may be created from alumina cast ceramic. In the embodiment illustrated in FIG. 2 the technical ceramic rods 202 may be disposed within the channel guides rails 102 and 104 adjacent to the vertical bar portions 209 which bound the cutouts 108 in the channel guide rails 102 and 104 so as to not overlap any of the cutouts 108 in each of the three sides. In an embodiment the channel guide rail 102 and 104 bar portions 209 may provide the outer support skeleton while the technical ceramic rods 202 may create rails that act as the mechanical fuel cell interface during sintering.

FIG. 3A illustrates a manifold base 302 for use with the channel guide rails 102 and 104 described above with reference to FIGS. 1 and 2. The manifold base 302 may be comprised of any suitable ceramic, such as alumina such as 97% pure alumina. Alternatively, the manifold base 302 may be comprised of less than 97% pure alumina, or more than 97% pure alumina, such as 97% to 98%, 98% to 99%, 99% to 99.5%, 99.5% to 100%, such as about 97%, about 98%, about 99%, or about 100%. In an embodiment the manifold base 302 may include holes 304 which are gas interfaces which line up with internal fuel cell stack riser channels and allow gases (e.g., fuel inlet and exhaust flows) to pass between the manifold base 302 and the fuel cell stack riser channels or bellows to be described below. In an embodiment, the manifold base 302 may include channels 306 (e.g., grooves) on the upper surface of the manifold base 302. The manifold base 302 may be configured to support both the channel guide rails 102 and 104 as well as fuel cell stacks placed on top of the manifold base 302, as will be described below.

FIG. 3B illustrates an optional spacer manifold 308 for use with the channel guide rails 102 and 104 described above with reference to FIGS. 1 and 2. The spacer manifold 308 may be comprised of any suitable ceramic, such as alumina such as 97% pure alumina. Alternatively, the spacer manifold 308 may be comprised of less than 97% pure alumina, or more than 97% pure alumina, such as 97% to 98%, 98% to 99%, 99% to 99.5%, 99.5% to 100%, such as about 97%, about 98%, about 99%, or about 100%. In an embodiment, the spacer manifold 308 may include channels 312 (e.g., grooves) on the upper surface of the spacer manifold 308 and channels 314 (e.g., grooves) in the lower surface of the spacer manifold 308. In an embodiment, the spacer manifold 308 may include gas interface openings 310 which pass through the spacer manifold 308 and line up with internal fuel cell stack riser channels. In an optional embodiment, the spacer manifold 308 may be configured to act as a separator between multiple stacks of fuel cells within the channel guide rails 102 and 104.

Figures 4A, 4B:
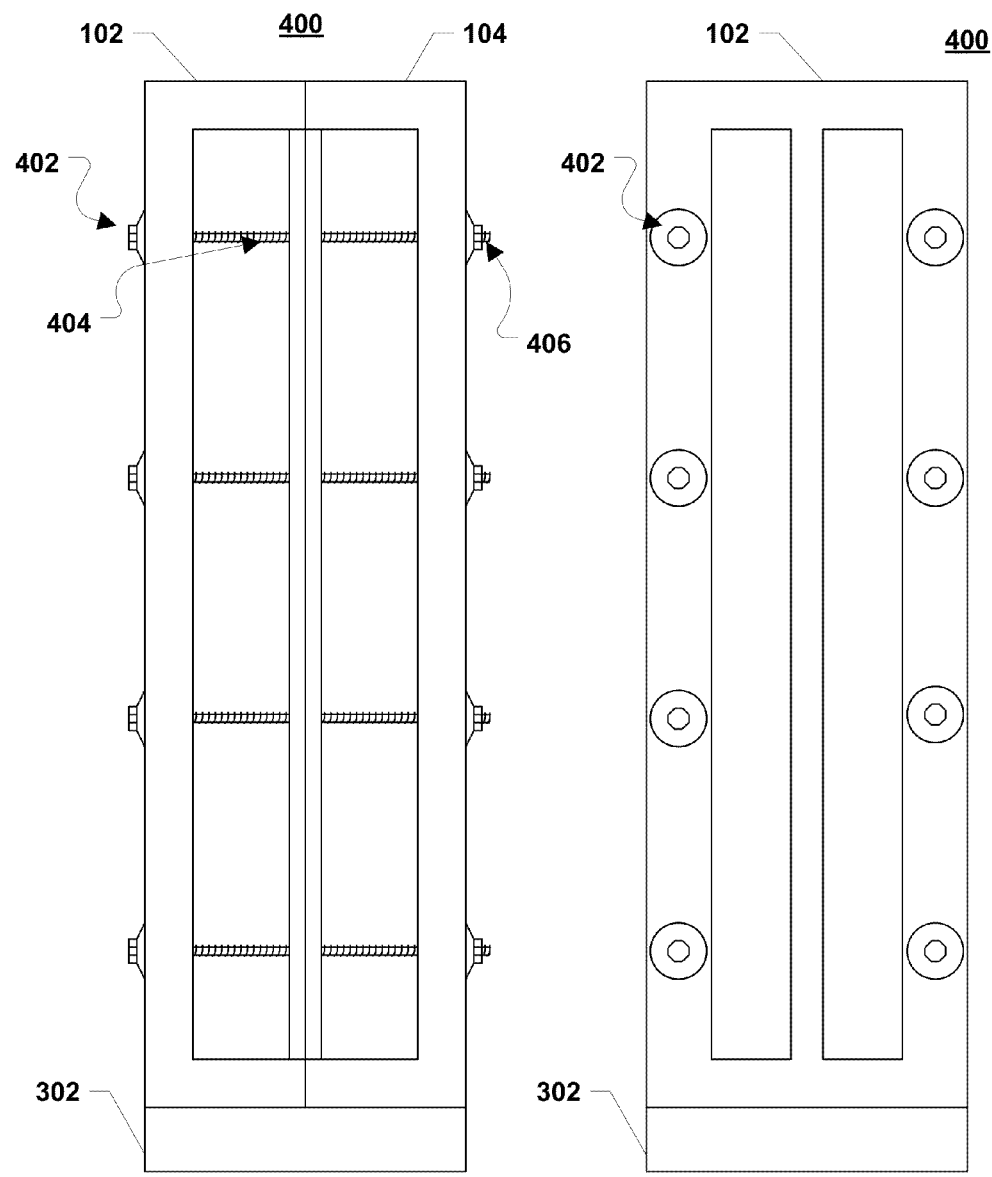
FIG. 4A illustrates a side view of an assembled channel guide according to an embodiment.
FIG. 4B illustrates a front view of an assembled channel guide according to an embodiment.

FIGS. 4A and 4B illustrate views of an assembled channel guide 400 according to an embodiment. FIG. 4A illustrates a side view of the channel guide 400 and FIG. 4B illustrates a front view of the channel guide 400. The channel guide 400 may be comprised of the channel guide rails 102 and 104 as described above with reference to FIG. 1. The channel guide rails 102 and 104 may be placed on top of the manifold base 302. Ceramic bolts or tie rods 402 may be used to clamp the channel guide rails 102 and 104 together. The ceramic bolt or tie rod 402 may have threading along a shaft 404 which may be passed through the holes 106 in the channel guide rails 102 and 104. A ceramic nut 406 may be coupled to the ceramic bolt or tie rod 402 and the ceramic nut 406 may be tightened on the ceramic bolt or tie rod 402 may to clamp the channel guide rail 102 and 104 together on the manifold base 302 to form the channel guide 400. The ceramic bolt or tie rod 402 and the ceramic nut 406 may be comprised of any suitable ceramic, such as alumina such as 97% pure alumina. Alternatively, the ceramic bolt or tie rod 402 and the ceramic nut 406 may be comprised of less than 97% pure alumina, or more than 97% pure alumina, such as 97% to 98%, 98% to 99%, 99% to 99.5%, 99.5% to 100%, such as about 97%, about 98%, about 99%, or about 100%. In alternative embodiments the channel guide rails 102 and 104 may be coupled together by other coupling means, such as fasteners, clamps, brazing, etc. While both the bolt or tie rod 402 and the nut 406 are preferably made from ceramic material, in alternative embodiments the bolt or tie rod 402 and the nut 406 may be made from metals, such as tungsten.

Figure 5:
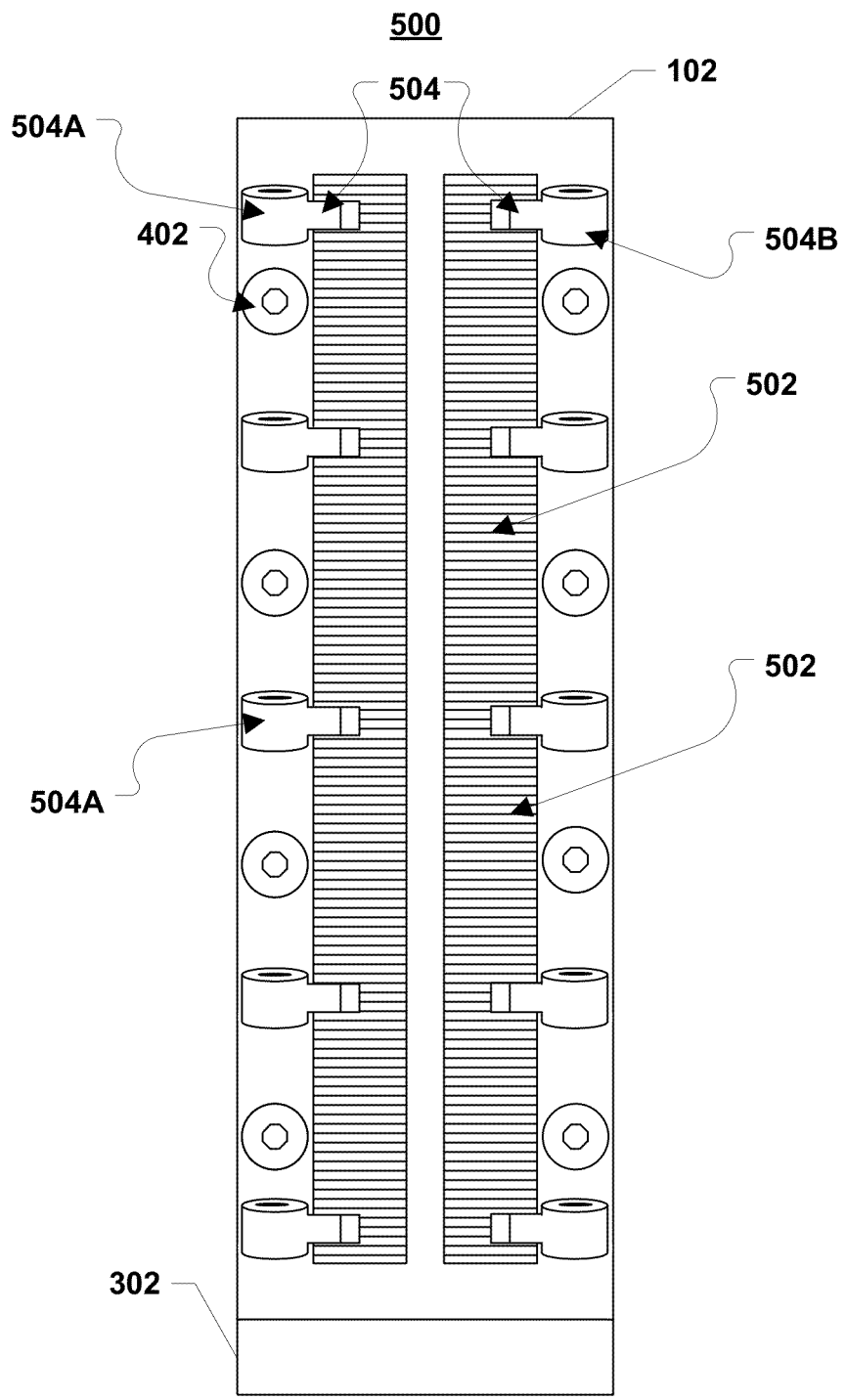
FIG. 5 illustrates a front view of an assembled channel guide containing a fuel cell stack column and fuel manifolds according to an embodiment.

FIG. 5 illustrates a front view of an assembled channel guide 500, similar to channel guide 400 described above with reference to FIGS. 4A and 4B with the addition of fuel cell stack(s) 502 and optional fuel manifolds 504 placed between adjacent stacks within the channel guide 500. The fuel manifolds 504 may include protruding fuel feed/return assemblies configured to input fuel into a feed port 504A and export fuel from an exhaust port 504B. The fuel manifolds 504 may be similar to those described in U.S. patent application Ser. No. 11/656,563 filed on Jan. 23, 2007 and published as U.S. Patent Publication No. 2007/0196704 A1, herein incorporated by reference in its entirety. The fuel manifolds 504 may be used in the hot box of the assembled power generation system. The fuel manifolds 504 may separate adjacent fuel cell stack(s) 502 and provide fuel into fuel cell stacks located above and below the fuel manifolds 504. In an embodiment, the channel guide 500 may be suitable for sintering any number of fuel cell stack(s) 502, such as 1-10 fuel cell stack(s) 502 containing at total of 25-250 cells, or any number in between, such as 100-150 fuel cells and adjacent interconnects in 2-4 stacks, at a temperature greater than 900 degrees Celsius (e.g., 950-1000 degrees Celsius) in air or inert (e.g., $N_2$) ambient. Channel guide rails 102 and 104 may prevent stack tilting and shifting when seals melt during sintering.

Figure 6:
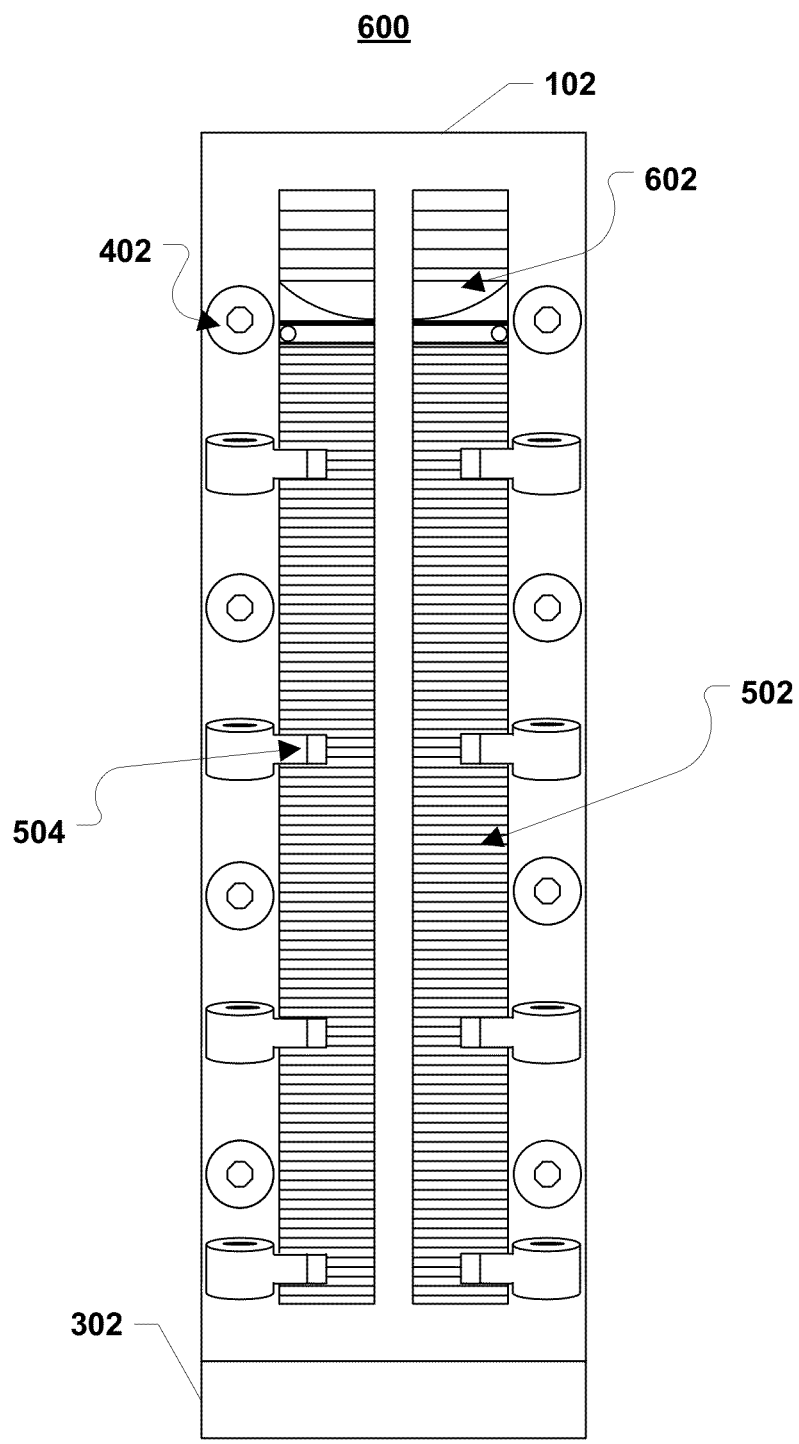
FIG. 6 illustrates a front view of an assembled channel guide containing a column of fuel cell stacks, fuel manifolds, and an internal compression system according to an embodiment.

FIG. 6 illustrates a front view of an assembled channel guide 600, similar to channel guide 500 described above with reference to FIG. 5 with the addition of an internal compression system 602. While illustrated as a leaf spring system, the internal compression system 602 may utilize any type of internal compression, such as a ceramic leaf spring system, coil springs, torsion springs, volute springs, pistons, air cylinders, fluid cylinders, rod shaped spacers, etc. The internal compression system 602 may be used to apply a compressive load to the fuel cell stack(s) 502 during sintering and conditioning of the fuel cell stack. The internal compression system 602 may comprise the system described in U.S. application Ser. No. 12/892,582 filed on Sep. 28, 2010, herein incorporated by reference in its entirety. The application of internal compression to the fuel cell stack(s) 502 during the sintering and/or conditioning cycle may enable flexibility in the sintering and condition cycles, such as by allowing the use of a continuous furnace or simplified batch furnace. Additionally, the use of internal compression may enable the channel guide 600 to be laid on its side in a furnace, such as on a moving conveyor in the furnace, during the sintering and conditioning cycles. In an embodiment, the internal compression system 602 may be added to the assembled channel guide 600 prior to sintering and conditioning to compress the fuel cell stack(s) 502. In an embodiment the internal compression system 602 may be used to compress the fuel cell stack(s) 502 during the sintering cycle and may be removed prior to a conditioning cycle. In an alternative embodiment, the internal compression system 602 may be used to constrain the fuel cell stack(s) 502 during the sintering and conditioning cycles and may be removed prior to installation in the power generation system.

In another alternative embodiment, the internal compression system 602 may be used to constrain the fuel cell stack(s) 502 during the sintering and conditioning cycles and may remain with the fuel cell stack(s) 502 after installation in the hot box of a power generation system and may be used during the power generation operations of the power generation system.

Figure 7:
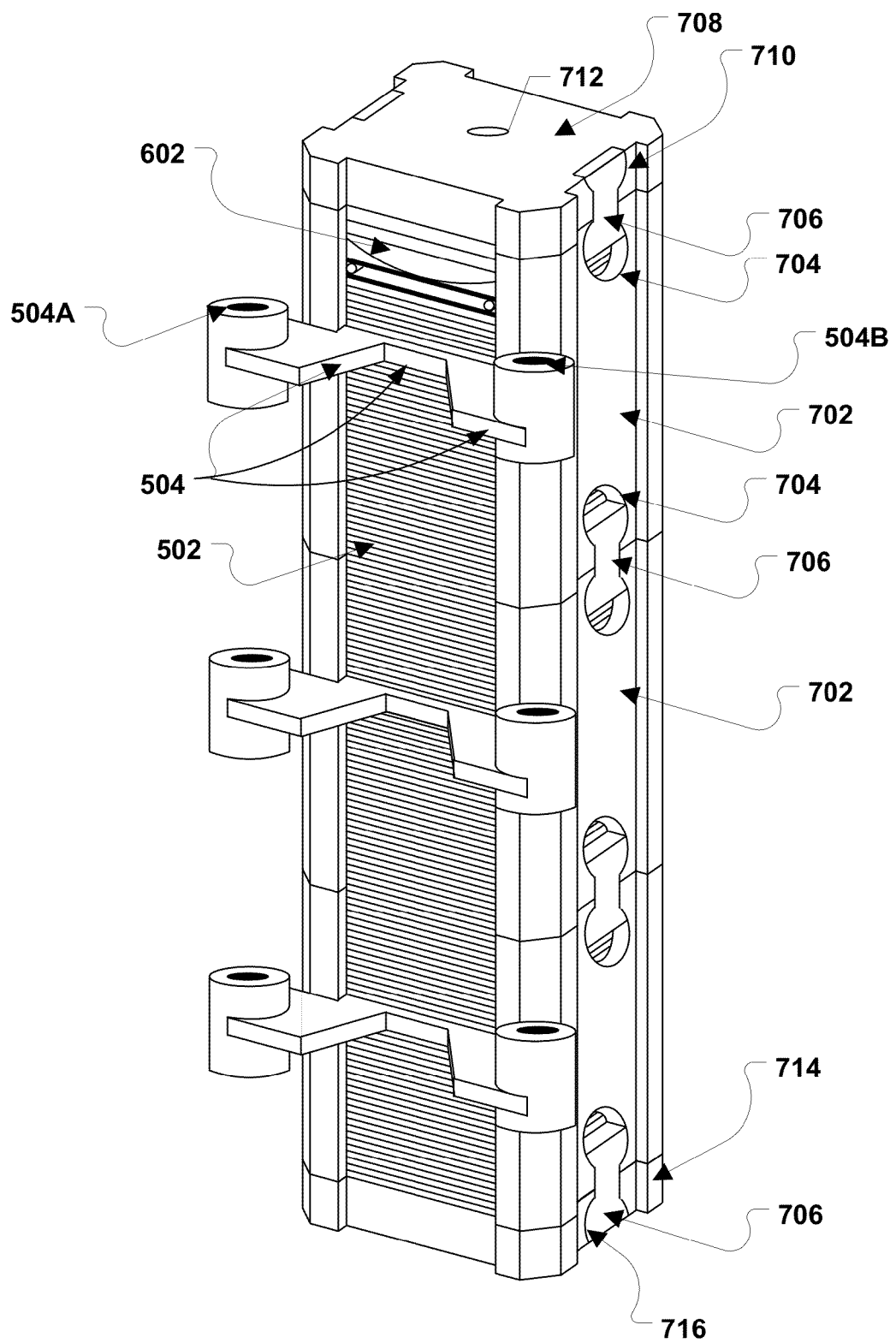
FIG. 7 illustrates a perspective view of a column of fuel cell stacks and fuel manifolds with plate shaped side baffles according to an embodiment.

FIG. 7 illustrates a column of fuel cell stack(s) 502 and fuel manifolds 504 with plate shaped side baffles 702 according to an embodiment. Exemplary side baffles 702 are described in U.S. application Ser. No. 12/892,582 noted above. The side baffles 702 may place a compressive load upon the fuel cell stack(s) 502 and may direct the cathode feed flow stream, such as air or another oxidizer to the fuel cell stack(s) 502 in the hot box during power generation system operation. The side baffles 702 may be comprised of high temperature material such as alumina, ceramic matrix composite, or other suitable ceramic. The side baffles 702 may have cutouts 704 for mating two side baffles 702 together. A bow tie shaped ceramic insert 706, narrower at the middle portion and wider at the ends may be placed in the cutouts 704 to join two side baffles 702. A top piece 708 and bottom piece 714 may join the side baffles 702 together as one unit enclosing the fuel cell stack(s) 502 and fuel manifolds 504. The top piece 708 may have a cutout 710 similar to the cutouts 704 in the side baffles 702. The bottom piece 714 may have a cutout 716 similar to the cutouts 704 in the side baffles 702. A bow tie shaped ceramic insert 706 may join the top piece 708 and the bottom piece 714, respectively, to the side baffles 702. The top piece may include a hole 712 to allow a tie rod or another device to apply additional external compression to the fuel cell stack(s) 502 if needed. In an embodiment, an internal compression system 602 as described above may be placed below the top piece 708 within the side baffles 702 to provide internal compression to the fuel cell stack(s) 502. In an embodiment, the internal compression system 602 may be added to the assembled channel guide 600 prior to sintering and conditioning to compress the fuel cell stack(s) 502. In an embodiment, the side baffles 702 and the internal compression system 602 may be used to compress the fuel cell stack(s) 502 during the sintering cycle and may be removed prior to a conditioning cycle. In an alternative embodiment, the side baffles 702 and the internal compression system 602 may be used to constrain the fuel cell stack(s) 502 during the sintering and conditioning cycles and may be removed prior to installation in the hot box of power generation system. In another alternative embodiment, the side baffles 702 and the internal compression system 602 may be used to constrain the fuel cell stack(s) 502 during the sintering and conditioning cycles and may remain with the fuel cell stack(s) 502 after installation in the hot box of the power generation system, and may be used during power generation operations of the power generation system.

Figures 8A, 8B:
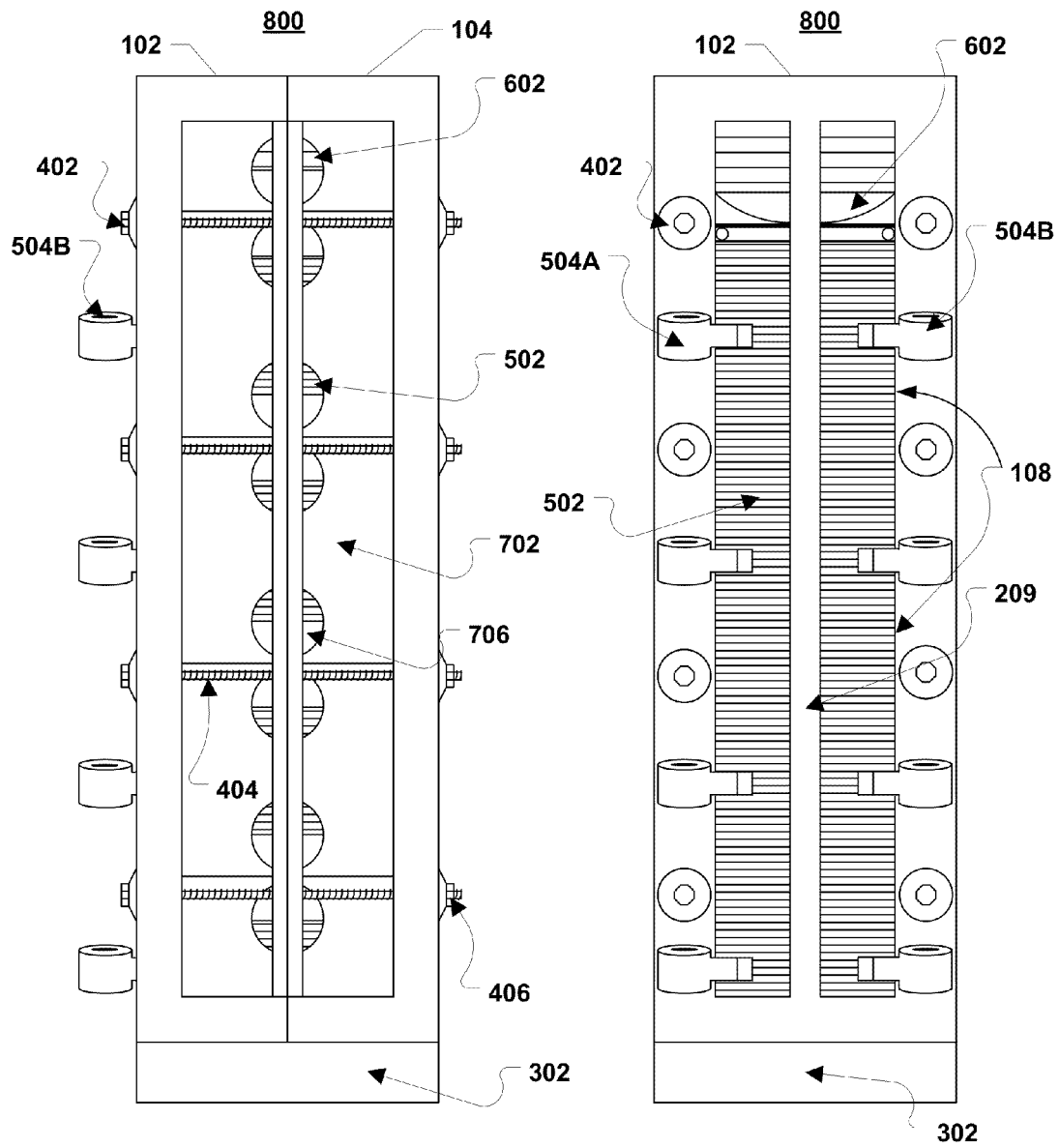
FIG. 8A illustrates a side view of an assembled channel guide containing a column of fuel cell stacks and fuel manifolds with plate shaped side baffles according to an embodiment.
FIG. 8B illustrates a front view of an assembled channel guide containing a column of fuel cell stacks and fuel manifolds with plate shaped side baffles according to an embodiment.
Figure 8C:
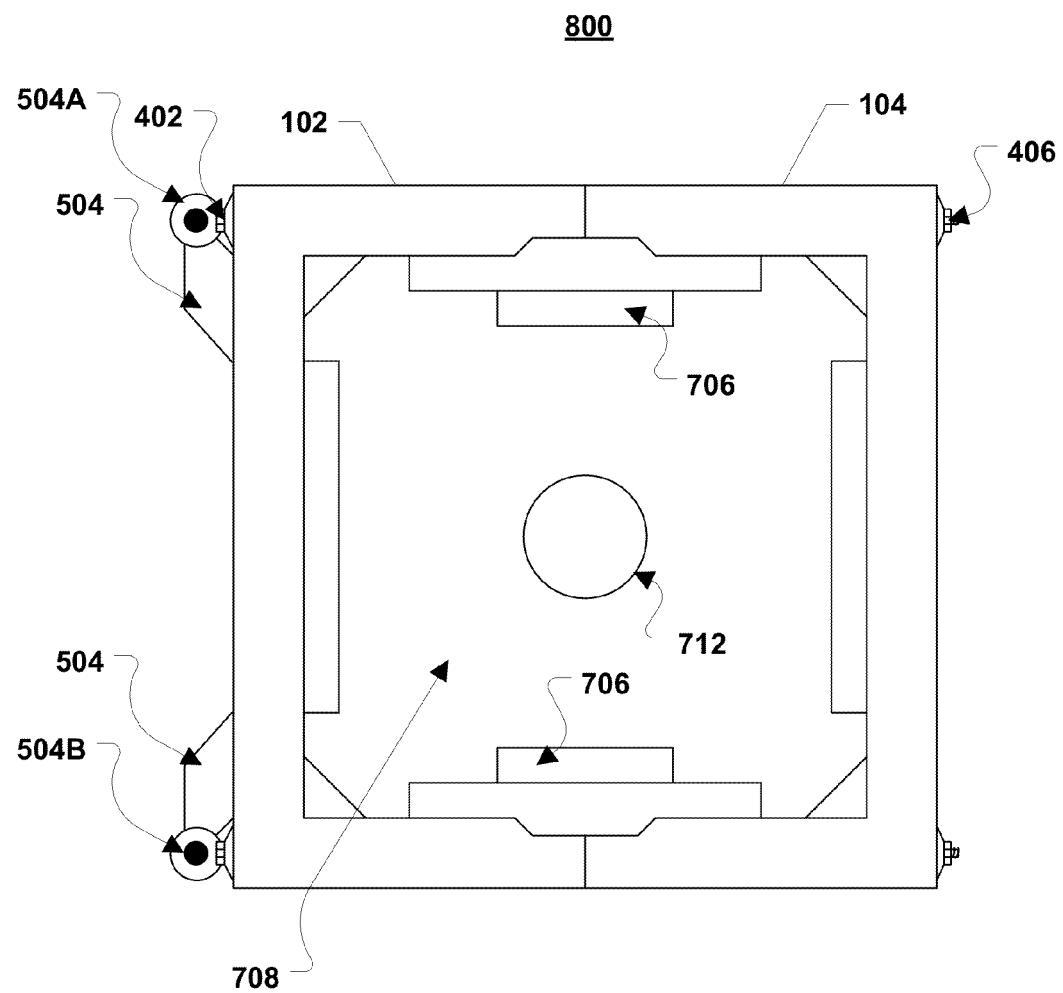
FIG. 8C illustrates a top view of an assembled channel guide containing a column of fuel cell stacks and fuel manifolds with plate shaped side baffles according to an embodiment.

FIGS. 8A, 8B, 8C, illustrate views of an assembled channel guide 800 combined with a column of fuel cell stack(s) 502, fuel manifolds 504, compression system 602, and plate shaped side baffles 702 according to an embodiment. Channel guide 800 is similar to channel guide 600 described above with reference to FIG. 6 with the addition of side baffles 702 and bow tie shaped ceramic inserts 706 as described above with reference to FIG. 7. FIG. 8A illustrates a side view of the channel guide 800. The channel guide rails 102 and 104 encompass (e.g., enclose and/or surround) the side baffles 702, fuel cell stack(s) 502, and fuel manifolds 504, all of which are placed on top of the manifold base 302. In an embodiment, internal compression may be provided by internal compression system 602 disposed within the side baffles 702 as described above with reference to FIG. 7. FIG. 8B illustrates a front view of the channel guide 800 where the edges of the fuel cell stack(s) 502 are exposed in the cutouts 108 between the vertical bar 209 portions of the channel guide rails 102 and 104. FIG. 8C illustrates a top view of the channel guide 800.

Figure 8D:
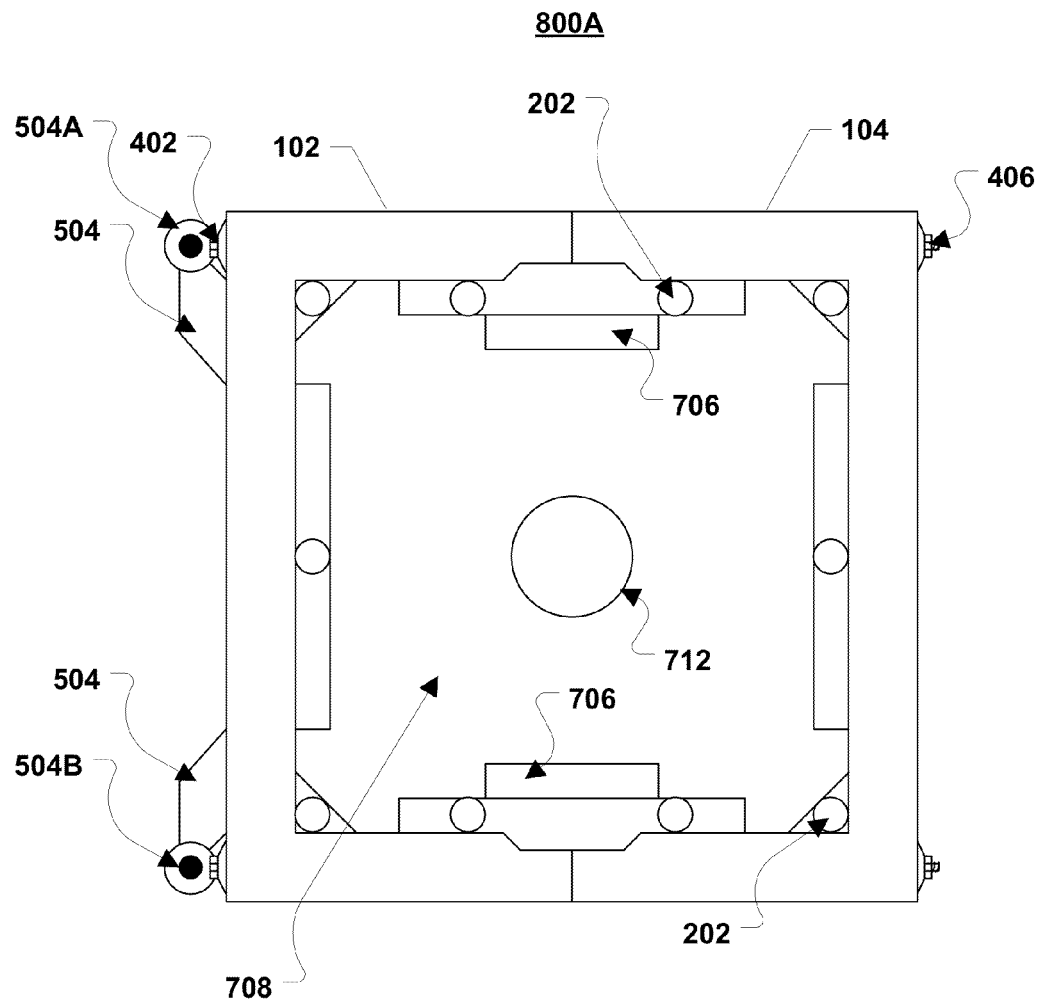
FIG. 8D illustrates a top view of an assembled channel guide containing a column of fuel cell stacks and fuel manifolds with plate shaped side baffles according to another embodiment.

FIG. 8D illustrates an alternative embodiment channel guide 800A in which technical ceramic rods 202 are coupled to the vertical bar 209 portions of the channel guide rails 102 and 104 as described above with reference to FIG. 2. The technical ceramic rods 202 may provide the interface between the side baffles 702 and the channel guide rails 102 and 104.

Figure 9A:
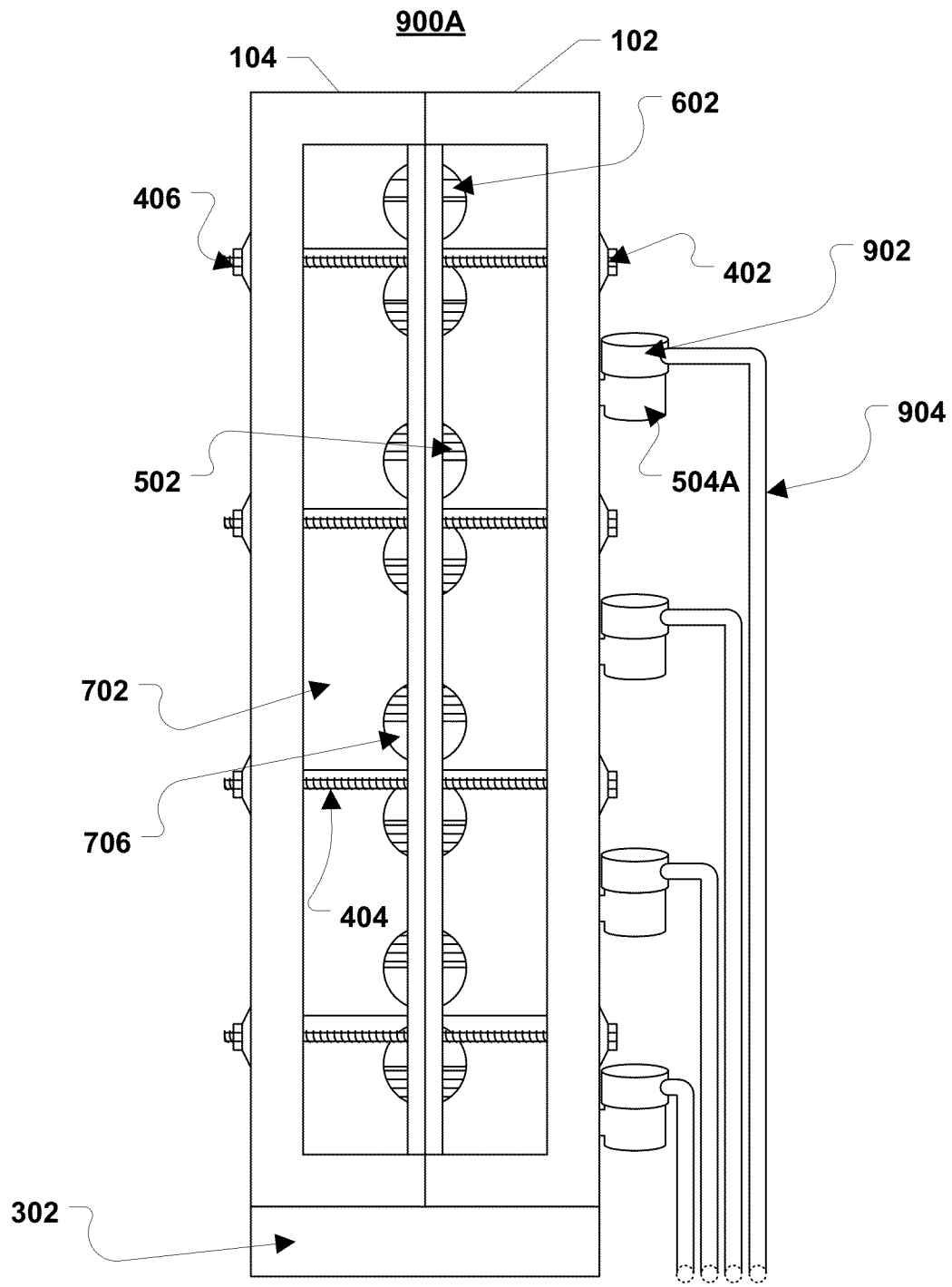
FIG. 9A illustrates a side view of an assembled channel guide containing a column of fuel cell stacks and fuel manifolds coupled to fuel bellows with plate shaped side baffles according to an embodiment.

FIG. 9A illustrates a side view of an assembled channel guide 900A similar to channel guide 800 described above with reference to FIGS. 8A-8C with the addition of fuel connection 902 and fuel bellows 904. Fuel connections 902 serve to connect the fuel manifolds 504 to the fuel bellows 904. Fuel bellows 904 may be a series of flexible tubes configured to accommodate axial (e.g., vertical) thermal expansion of the fuel cell stack and each fuel bellow 904 may be tied to a fuel supply or a fuel exhaust to provide or exhaust fuel from the ports 504A, 504B of the fuel manifold 504 accordingly. The combination of fuel connections 902 and fuel bellows 904 may constitute a fuel tree for providing and recycling fuel to the fuel cell stack(s) 502. While only one set of fuel bellows 904 is shown in FIG. 9A for providing fuel flow (or fuel exhaust) to the inlet or exhaust ports of the manifold 504 it should be understood that another set of bellows for collecting fuel exhaust (or providing inlet fuel) is located below the plane of the figure. Connections 902 may comprise caps which fit over openings in protruding port 504A, 504B portions of the fuel manifold 504. In an alternative embodiment, flexible fuel tubes are used instead of the fuel bellows 904. The flexibility of the tubes may also be attained by the use of an L-bend or additional service loops in the flexible tubes.

Figure 9B:
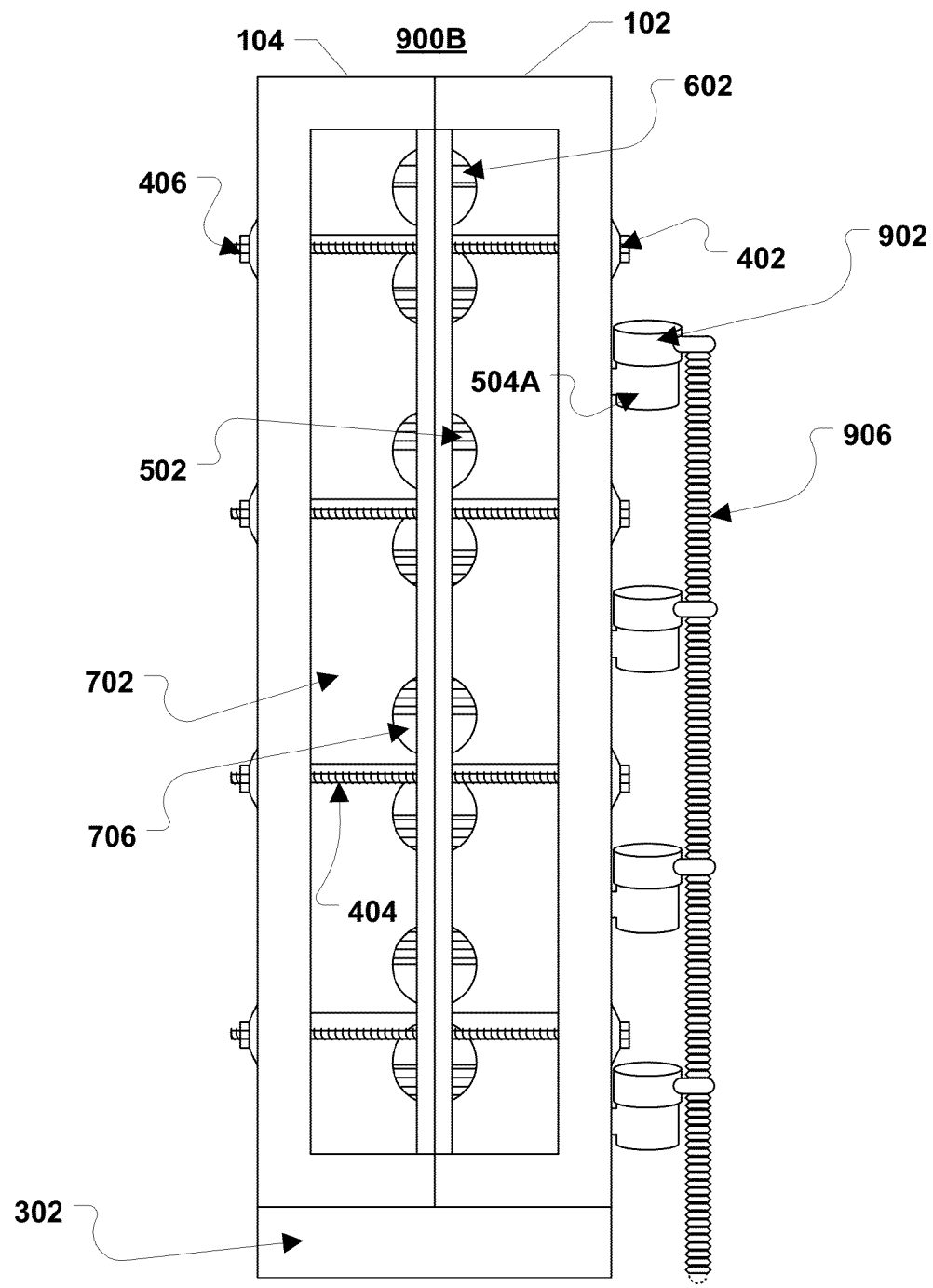
FIG. 9B illustrates a side view of an assembled channel guide containing a column of fuel cell stacks and fuel manifolds coupled to fuel bellows with plate shaped side baffles according to another embodiment.

FIG. 9B illustrates a side view of an assembled channel guide 900B similar to channel guide 900A described above with reference to FIG. 9A except that the individual fuel bellows 904 are replaced with common fuel bellows 906 interconnecting each of the fuel manifolds 504. Exemplary fuel bellows are described in U.S. patent application Ser. No. 11/656,563 filed on Jan. 23, 2007 and published as U.S. Patent Publication No. 2007/0196704 A1 as noted above. The fuel bellows 906 may be flexible tubes configured to accommodate thermal expansion of the fuel cell stack. Preferably, the fuel bellows 906 are removed after sintering and/or conditioning if these steps are conducted outside the hot box of a power generation system. In the channel guide 900B the upper most fuel connection 902 may also serve as an end cap to the fuel supply and exhaust return systems. The combination of fuel connections 902 and fuel bellows 906 may constitute a fuel tree for providing and recycling fuel to the fuel cell stack(s) 502. While only one fuel bellow 906 is shown in FIG. 9B for providing fuel flow (or fuel exhaust) to the inlet or exhaust ports of the manifold 504 it should be understood that another bellows for collecting fuel exhaust (or providing inlet fuel) is located below the plane of the figure.

Figure 9C:
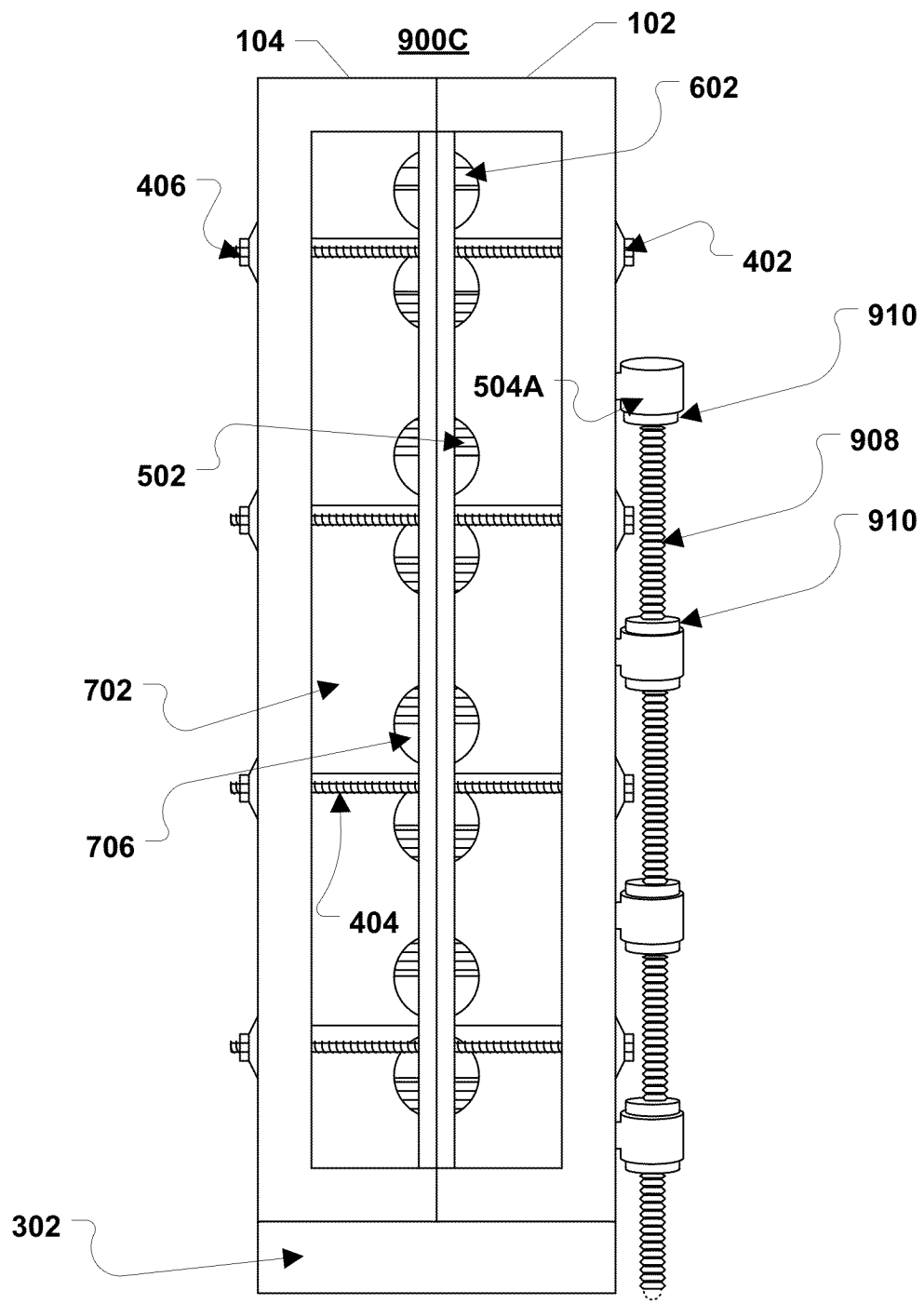
FIG. 9C illustrates a side view of an assembled channel guide containing a column of fuel cell stacks and fuel manifolds coupled to fuel bellows with plate shaped side baffles according to a third embodiment.

FIG. 9C illustrates a side view of an assembled channel guide 900C similar to channel guide 900B described above with reference to FIG. 9B except that common fuel bellows 908 are installed directly between the fuel manifolds 504 without the use of fuel connections 902. Fuel bellows 908 may be connected directly between the manifolds 504 and the ends of fuel bellows 908 may be configured with fluid connections 910 which may couple the fuel bellows 908 to the inlet and/or exhaust ports of the manifold 504. The combination of fuel bellows 908 may constitute a fuel tree for providing and recycling fuel to the fuel cell stack(s) 502. While only one fuel bellow 908 is shown in FIG. 9C for providing fuel flow (or fuel exhaust) to the inlet or exhaust ports of the manifold 504 it should be understood that another bellows for collecting fuel exhaust (or providing inlet fuel) is located below the plane of the figure. In an embodiment in which the fuel bellows 908 may be connected between the manifolds 504, during conditioning an electrical insulating element may be required in the fuel bellows 908 to avoid shorting the fuel cell stack(s) 502.

Figure 10B:
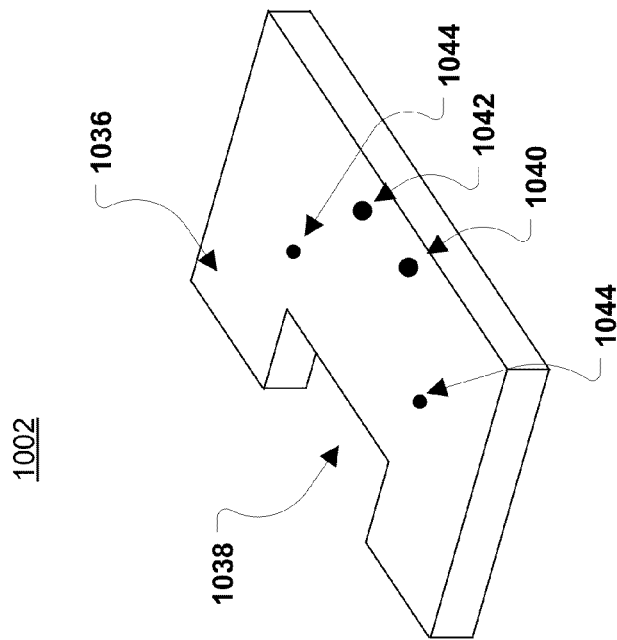
FIG. 10B illustrates a perspective view of a fuel cell column cartridge plate according to an embodiment.
Figure 10A:
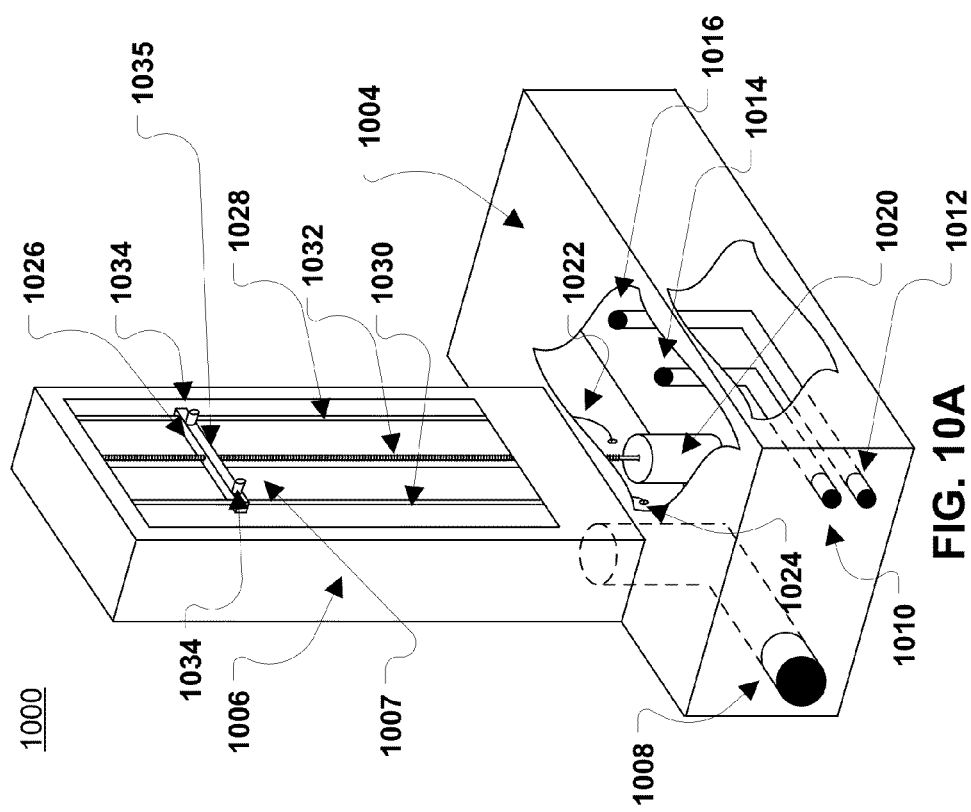
FIG. 10A illustrates a perspective view of a fuel cell column cartridge base according to an embodiment.

FIG. 10A illustrates a fuel cell column cartridge base 1000 and FIG. 10B illustrates a fuel cell column cartridge plate 1002 according to an embodiment. The fuel cell column cartridge base 1000 and fuel cell column cartridge plate 1002 may enable a fuel cell column to be assembled and transported (e.g., into the hot box or into the sintering/conditioning furnace) in a pre-processed condition. The fuel cell column cartridge base 1000 and fuel cell column cartridge plate 1002 may contain multiple technological elements, such as mechanical compression, mechanical guides, mechanical constraints, voltage sensing, cathode gas (e.g., air) delivery, and anode gas (e.g., fuel) delivery. The fuel cell column cartridge base 1000 and fuel cell column cartridge plate 1002 may interface with the process furnace and may enable the production of a sintered/conditioned fuel cell column. The fuel cell column cartridge base 1000 and fuel cell column cartridge plate 1002 may be reusable in a mass production environment. The fuel cell column cartridge base 1000 and fuel cell column cartridge plate 1002 may enable the fuel cell columns to be built via automation. The fuel cell column cartridge base 1000 and fuel cell column cartridge plate 1002 may provide a method for securing and transporting a fuel cell column to facilitate less handling, improved component organization, provide a common interface for system components, and standardize interfaces for measurement equipment.

FIG. 10A illustrates a fuel cell column cartridge base 1000 according to an embodiment. The fuel cell column cartridge base 1000 may be comprised of a base surface 1004 and an air bucket 1006. The fuel cell column cartridge base 1000 may have an air input conduit 1008 to provide air from an external air source (e.g., an air blower) to the air manifold (e.g., air bucket) 1006. The air bucket 1006 has an open surface 1007 facing the area where the fuel cell stack(s) will be positioned on the base 1002 inside the channel guide rails 102 and 104. The fuel cell column cartridge base 1000 may have a fuel inlet conduit 1010 to provide fuel from an external fuel source to the fuel inlet coupling 1014. A fuel exhaust conduit 1012 may receive fuel exhaust from the fuel exhaust coupling 1016 and pass fuel exhaust out of the fuel cell column cartridge base 1000 via fuel exhaust conduit 1012. Conduits 1008, 1010, 1012 may have one end in the side of the base 1000 and another end in the top surface 1004. While shown in a configuration in which conduit 1010 is above conduit 1012, conduits 1010 and 1012 may be provided in any other configuration, such as side by side. Additionally, conduits 1008, 1010, and 1012 may take any path through the fuel cell column cartridge base 1000. The air bucket 1006 may contain a current and voltage measurement device 1026 configured to measure current and voltage along a linear array of current or voltage sources (e.g., the fuel cell stacks in the column or the interconnects in each stack). An exemplary current and voltage measurement device 1026 is described in U.S. Provisional Application No. 61/511,308 filed on Jul. 25, 2011, which is incorporated herein by reference in its entirety. The current and voltage measurement device 1026 may be comprised of two sensing probes 1034 on a carriage 1035. The carriage 1035 may be driven up and down (e.g., along the height) along the side of the air bucket 1006 facing the fuel cell column via a drive screw 1032 driven by an electrical motor 1020 housed within the fuel cell column cartridge base 1000. Signal carrying members 1028 and 1030 (e.g., cables or wires) may connect the sensing probes 1034 to the probe output wires 1022 and 1024. The probe output wires 1022 and 1024 may enable remote sensing of the current and/or voltage external from the fuel cell column cartridge base 1000. In an alternative embodiment, the measurement device 1026 may only measure voltage while current may be measured using a shunt outside the furnace hot zone. While shown as a rectangular surface, the fuel cell column cartridge base 1000 and base surface 1004 may be made in any shape, such as circular. In an embodiment, the fuel cell column cartridge base 1000 may be indexible by a robot and/or forklift. In this manner, the fuel cell column cartridge base 1000 may be indexible from a build area to a conditioning and/or sintering area, to a hot box, and/or to a post processing area where channel guide rails may be removed from the fuel cell stack(s).

FIG. 10B illustrates a fuel cell column cartridge plate 1002 according to an embodiment. The fuel cell column cartridge plate 1002 may enable the fuel cell column to be built up and moved to the fuel cell column cartridge base 1000. The fuel cell column cartridge plate 1002 may comprise a top surface 1036 and a cutout 1038. The cutout 1038 may be configured to engage the air bucket 1006 of the fuel cell column cartridge base 1000 when the fuel cell column cartridge plate 1002 is placed on top of the fuel cell column cartridge base 1000. The fuel cell column cartridge plate 1002 may have a fuel riser opening 1040 configured to connect to the fuel inlet coupling 1014 of the fuel cell column cartridge base 1000 and to a fuel bellow. The fuel cell column cartridge plate 1002 may have a fuel exhaust riser opening 1042 configured to connect to the fuel exhaust coupling 1016 of the fuel cell column cartridge base 1000 and to a fuel bellow. In an embodiment the fuel cell column cartridge plate 1002 may have tie rod pass through opening(s) 1044 for passing tie rods through the fuel cell column cartridge plate 1002.

Figure 11A:
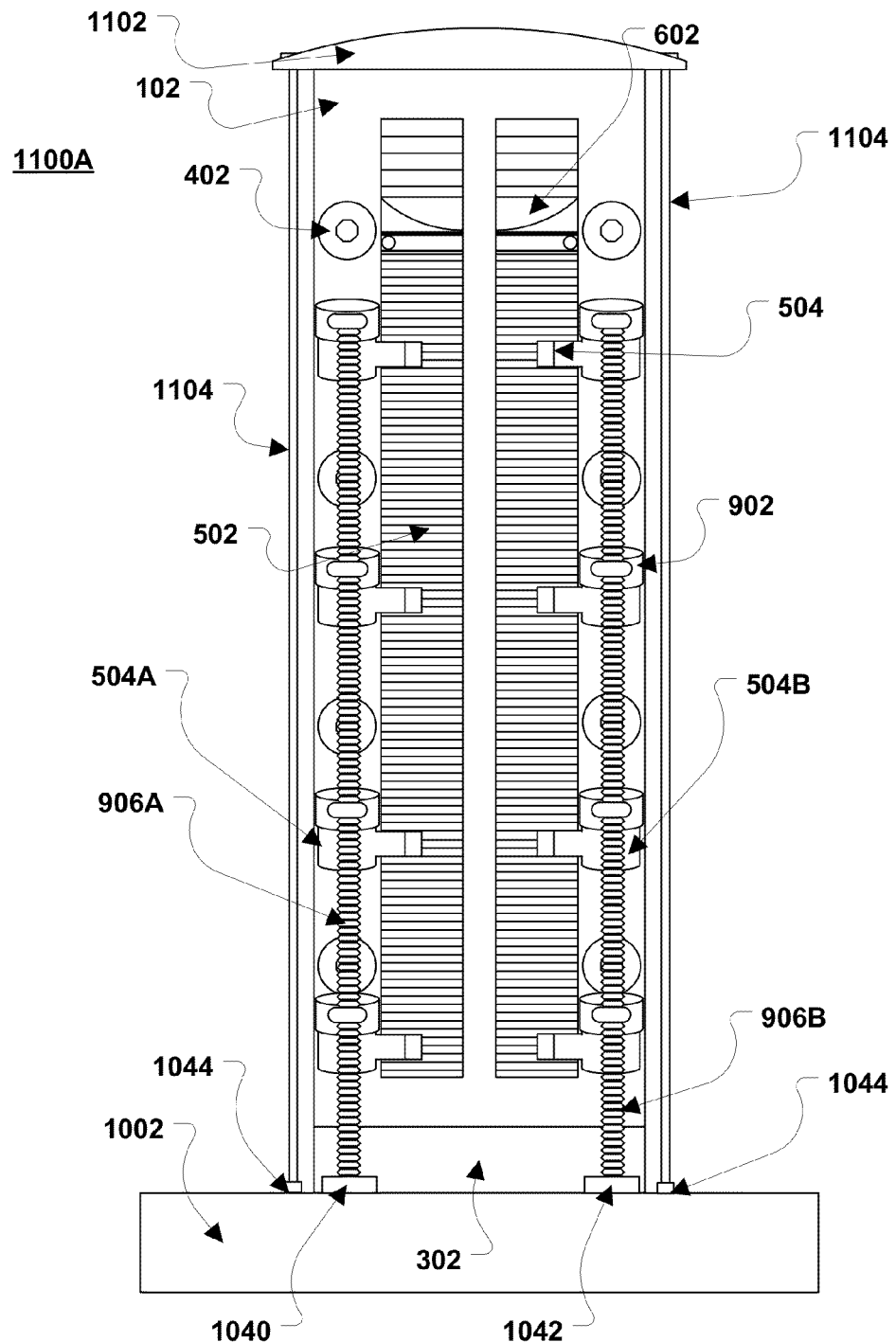
FIGS. 11A-11C illustrate front views of fuel cell column cartridge assemblies according to various embodiments.
Figure 11B:
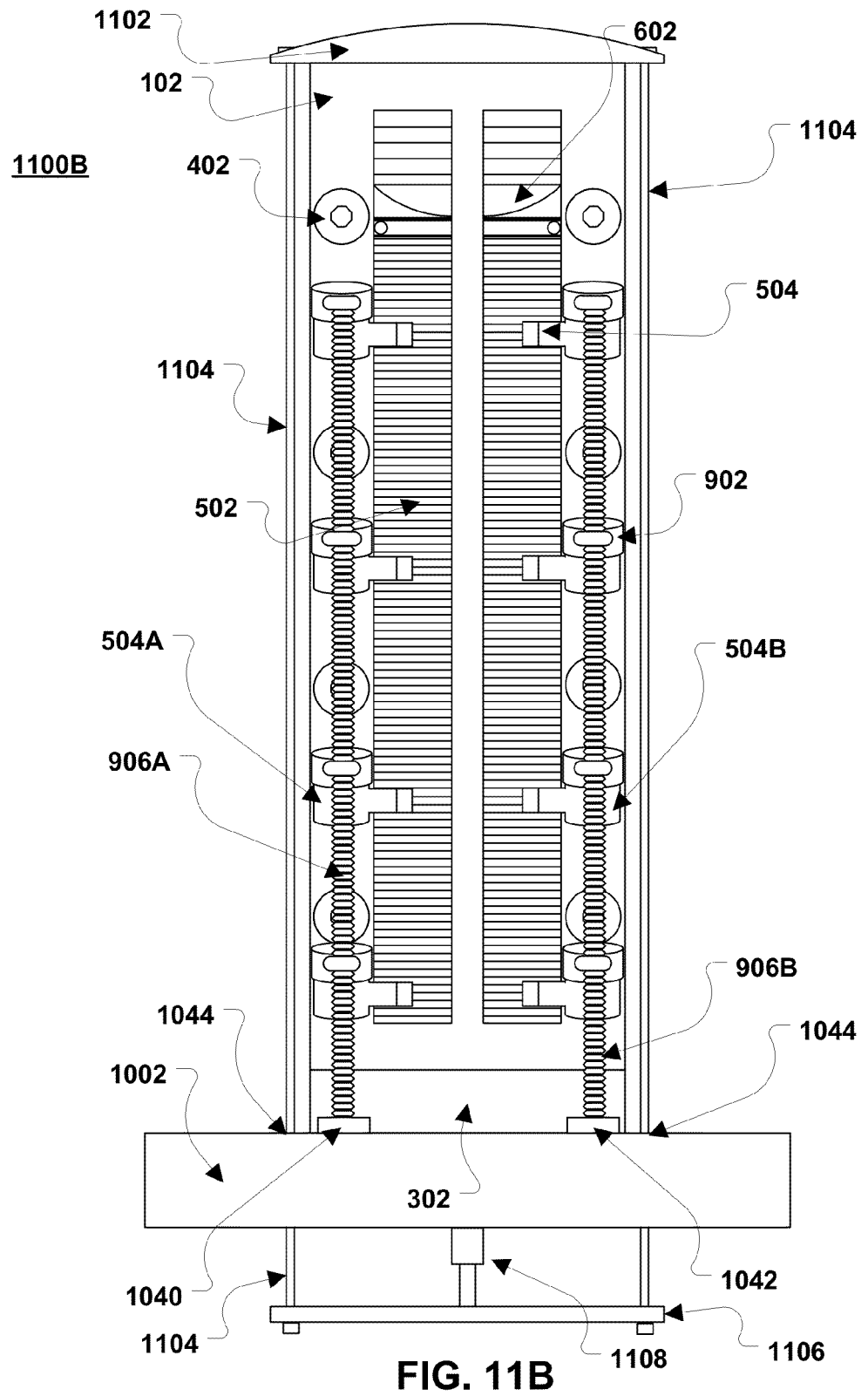
Figure 11C:
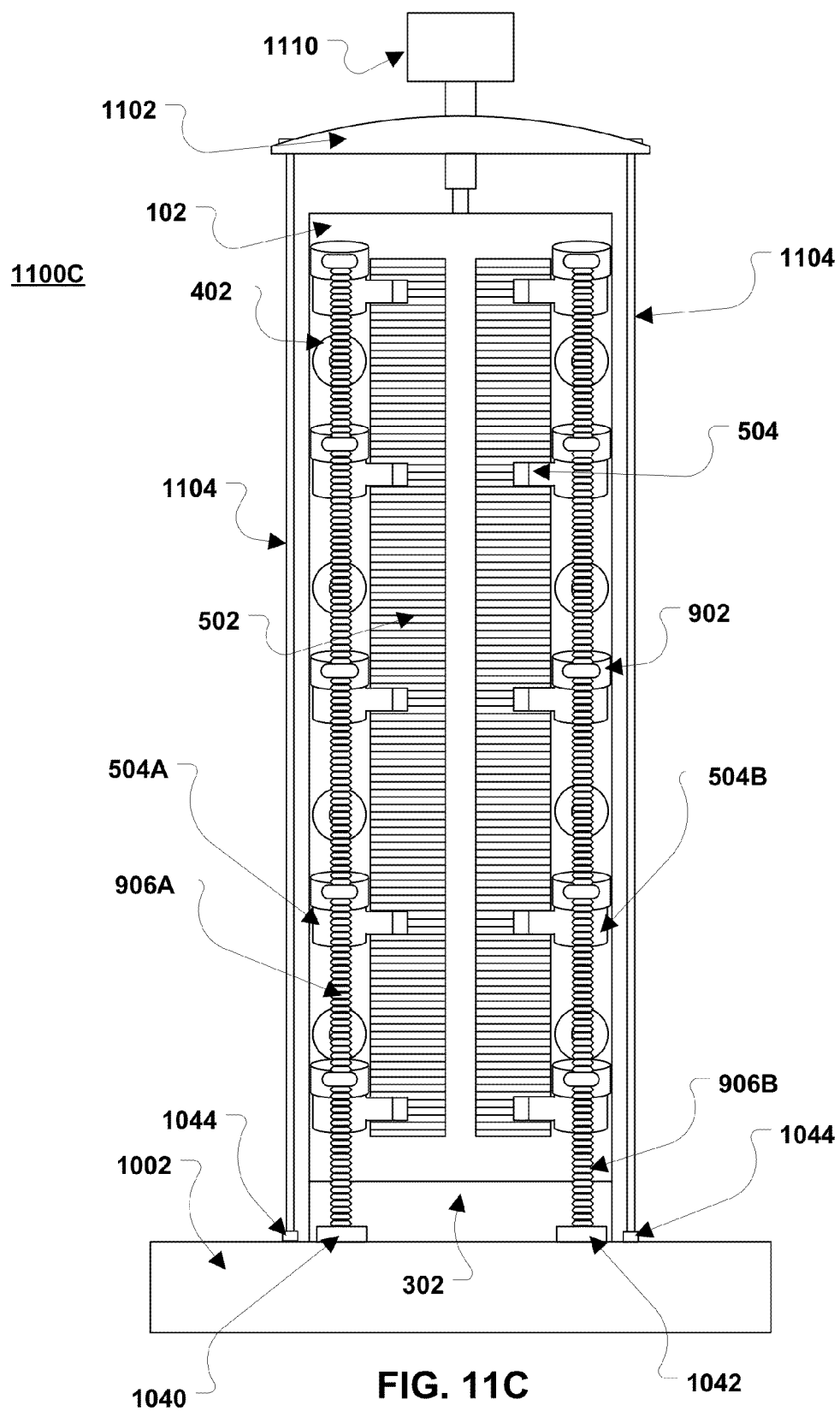

FIGS. 11A, 11B, and 11C illustrate fuel cell column cartridge assemblies 1100A, 1100B, and 1100C, respectively, according to various embodiments. A fuel cell column cartridge assembly, 1100A, 1100B, or 1100C may be formed by coupling a fuel cell column to the fuel cell column cartridge plate 1002 as described above with reference to FIG. 10B. In an embodiment the column cartridge plate 1002 may be placed on the fuel cell column cartridge base 1000 and the column cartridge plate 1002 and the fuel cell column cartridge base 1000 may be placed on a hot box base of a power generation system after sintering and conditioning the fuel cell column. In an alternative embodiment, the fuel cell column may be directly coupled to the fuel cell column base 1000 without the use of a fuel cell column cartridge plate 1002. In a further embodiment, a fuel tree may be placed on the base plate and connected to the fuel cell column, such as by bellows connected to a fuel manifold of the fuel cell column. In an embodiment, the fuel cell column cartridge base 1000, column cartridge plate 1002, fuel tree, and fuel cell column may be enclosed on the hot box base with a hot box lid. In an alternative embodiment, the fuel tree may be removed from the fuel cell column after sintering and/or conditioning, and the fuel cell column cartridge base 100, column cartridge plate 1002, and fuel cell column may be placed on a hot box base of a power generation system.

FIG. 11A illustrates a fuel cell column cartridge assembly 1100A comprised of an assembled channel guide 900B as described above with reference to FIG. 9B coupled to the fuel cell column cartridge plate 1002. The assembled channel guide 900B may be coupled to the fuel cell column cartridge plate 1002 via a tie bar system comprised of tie bars 1104 connected by a retaining member 1102 (e.g., a metal or ceramic cap or tie bar). Respective inlet and exhaust fuel bellows 906A, 906B may be coupled to the fuel riser 1040 and the fuel exhaust riser 1042.

FIG. 11B illustrates a fuel cell column cartridge assembly 1100B similar to fuel cell column cartridge assembly 1100A described above with reference to FIG. 11A except that tension is placed on the tie bar system via a cylinder 1108 attached to a tension member (e.g., tension plate) 1106 connected between the tie rods or bars 1104 below plate 1002. The cylinder 1108 may be any type pneumatic cylinder, such as an air cylinder or oil cylinder. In another embodiment, the cylinder 1108 and tension member 1106 may be decoupled from the fuel cell column cartridge plate 1002. In an alternative embodiment, the cylinder 1108 may be replaced by a spring which may exert force on the tension member 1106 thereby tensioning the tie bar system.

FIG. 11C illustrates a fuel cell a fuel cell column cartridge assembly 1100C in which an assembled channel guide similar to assembled channel guide 500 described above with reference to FIG. 5 is coupled to the fuel cell column cartridge plate 1002. No internal compression system is used, rather external compression is provided by a cylinder 1110. The cylinder 1110 may be any type pneumatic cylinder, such as an air cylinder or oil cylinder and may be decoupled from the fuel cell column cartridge assembly 1100C. The cylinder 1110 may apply pressure to the fuel cell stack(s) 502 through hole 712 in top piece 708, discussed above with reference to FIGS. 7, 8C, and 8D. In an alternative embodiment, the cylinder 1110 may be replaced by a spring which may apply pressure to the fuel cell stack(s) 502 through hole 712.

Figure 12A:
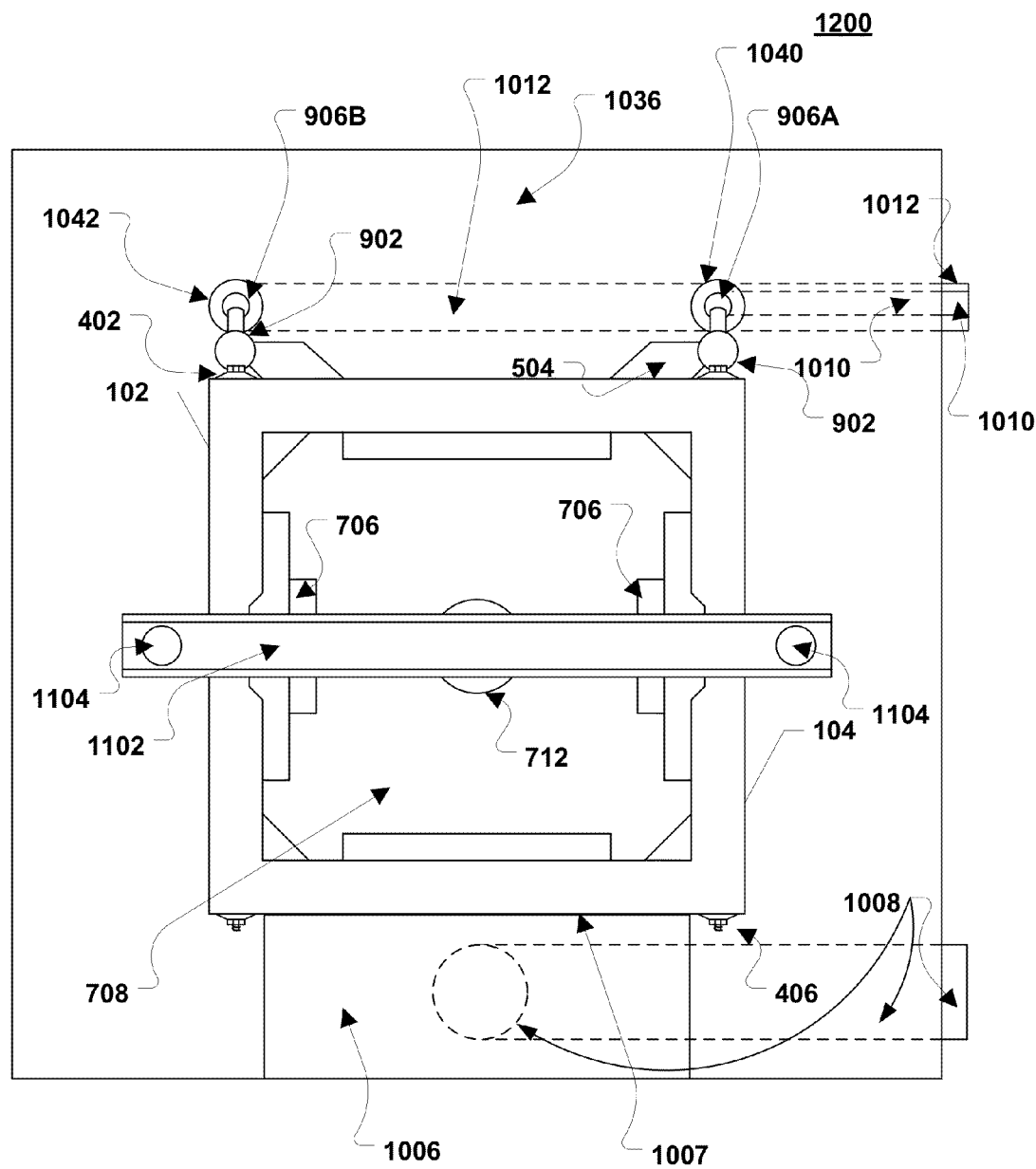
FIGS. 12A-12B illustrate top views of a fuel cell column cartridge assembly system according to various embodiments.
Figure 12B:
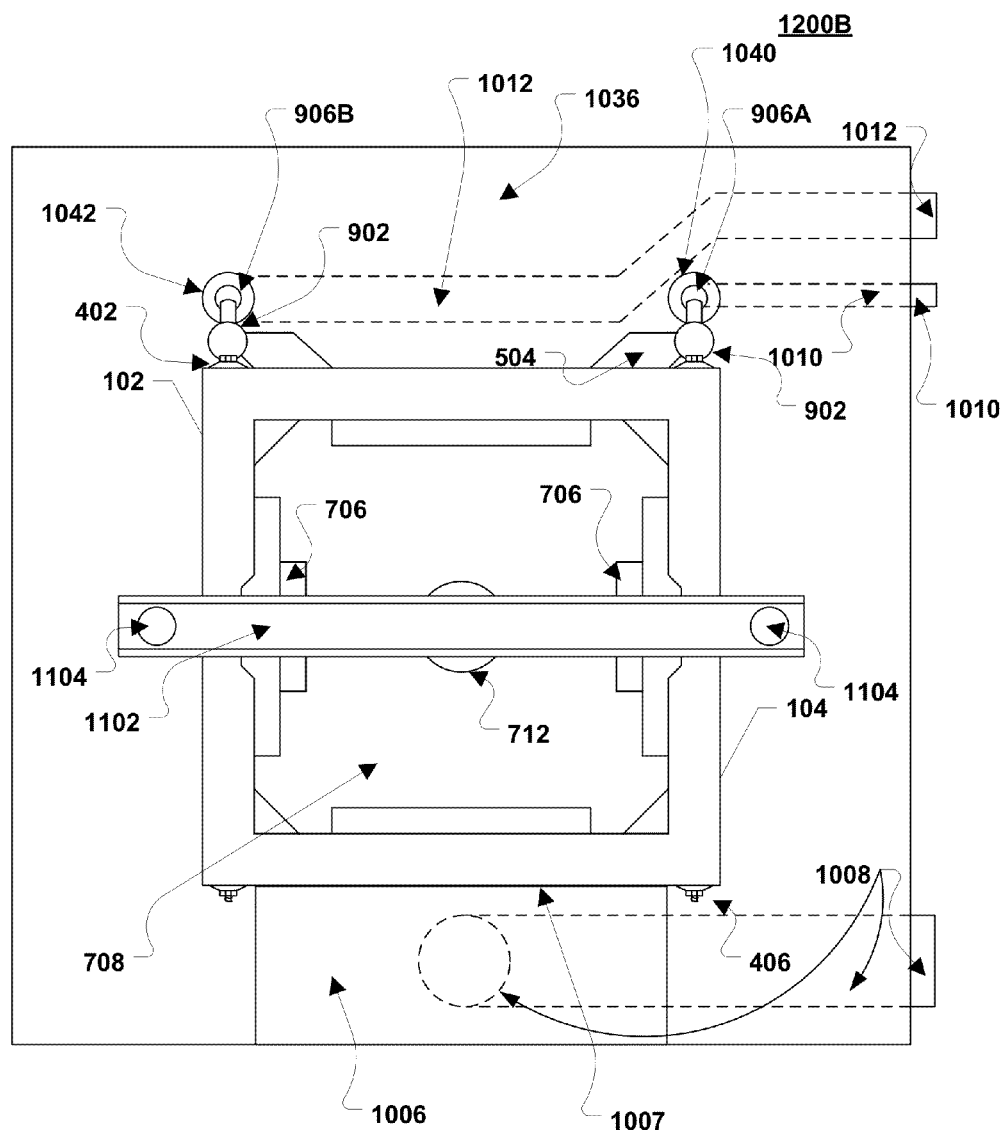

FIGS. 12A, 12B, 13, and 14 illustrates different views of a fuel cell column cartridge assembly system 1200 according to an embodiment. The fuel cell column cartridge assembly system 1200 may be comprised of a fuel cell column cartridge assembly 1100A described above with reference to FIG. 11A, coupled to a fuel cell column cartridge base 1000 described above with reference to FIG. 10A. FIG. 12A illustrates a top view of the fuel cell column cartridge assembly system 1200. The fuel cell column cartridge assembly 1100A may be placed on the fuel cell column cartridge base 1000 such that the opens side 1007 of the air bucket 1006 contacts the partially open back of the channel guide rail 104 to provide air into fuel cell stacks. FIG. 12A illustrates an embodiment in which the conduits 1010 and 1012 are vertically aligned, with conduit 1010 above conduit 1012. FIG. 12B illustrates an alternative embodiment in which conduits 1010 and 1012 may be horizontally aligned. In an embodiment, conduit 1012 may take a non-linear path through the fuel cell column cartridge plate 1002. In the various embodiments, conduits 1008, 1010, and 1012 may take any path through the fuel cell column cartridge plate 1002.

Figure 13:
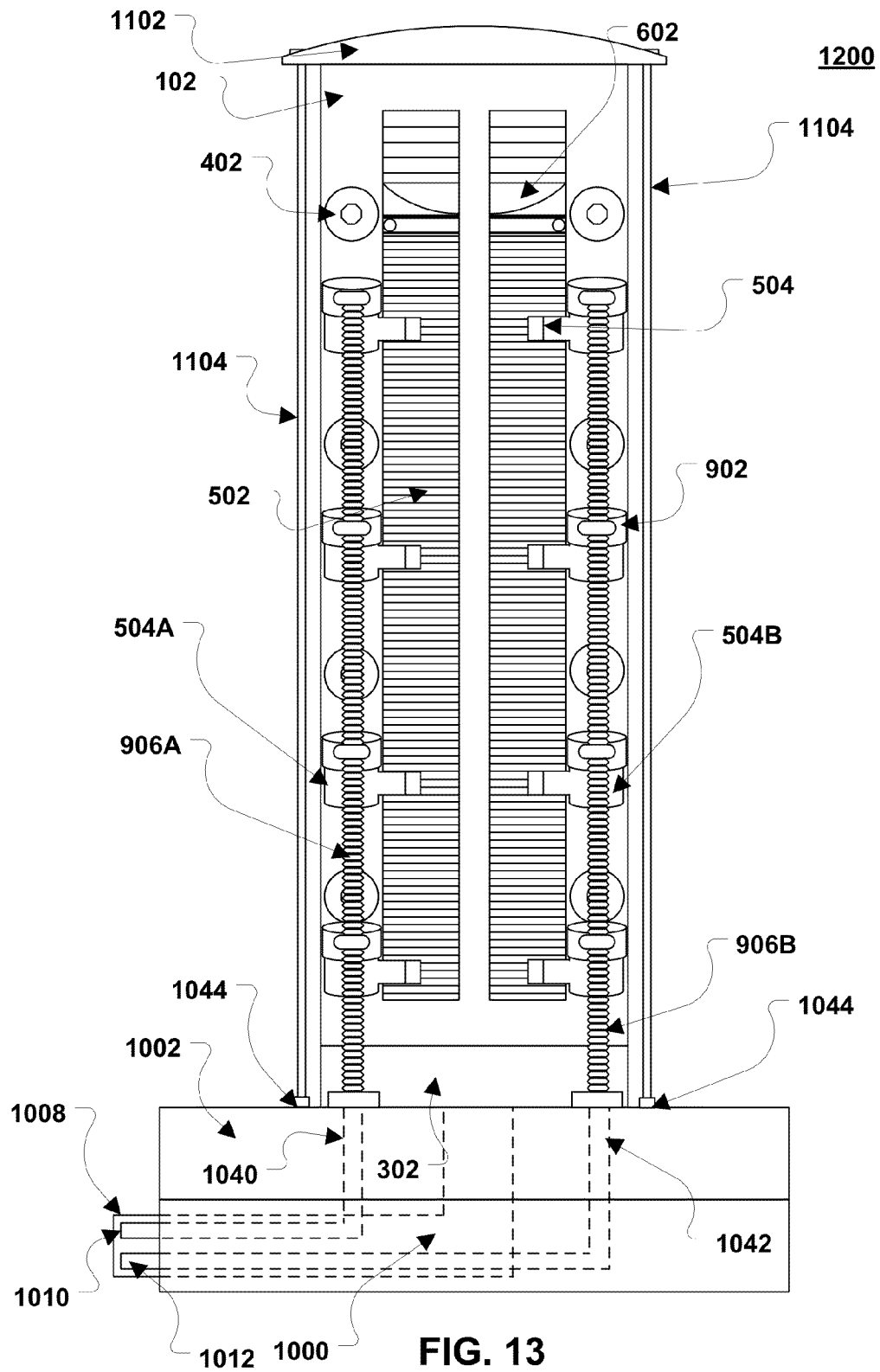
FIG. 13 illustrates a front view of a fuel cell column cartridge assembly system according to an embodiment.
Figure 14:
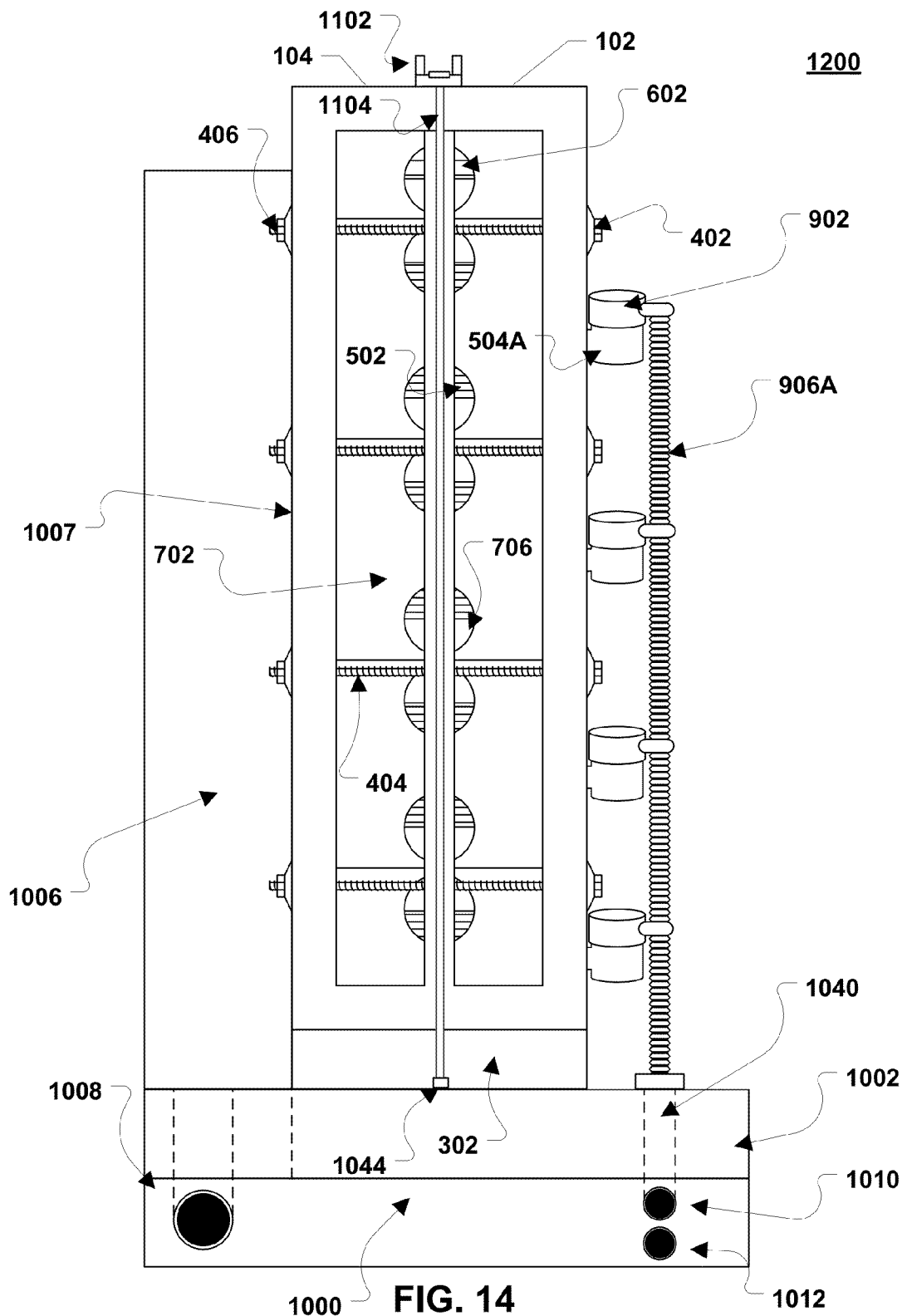
FIG. 14 illustrates a side view of a fuel cell column cartridge assembly system according to an embodiment.

FIG. 13 illustrates a front view of the fuel cell column cartridge assembly system 1200. The fuel cell column cartridge plate 1002 may be positioned on the fuel cell column cartridge base 1000 such that fuel inlet streams and fuel exhaust streams may pass through the riser opening 1040, 1042 in fuel cell column cartridge plate 1002 and to and from the fuel inlet and exhaust bellows 906A and 906B. FIG. 14 illustrates a side view of the fuel cell column cartridge assembly system 1200 illustrating the positioning of the fuel cell column cartridge assembly 1100A described above with reference to FIGS. 11A and 11B, coupled to a fuel cell column cartridge base 1000.

Figure 15:
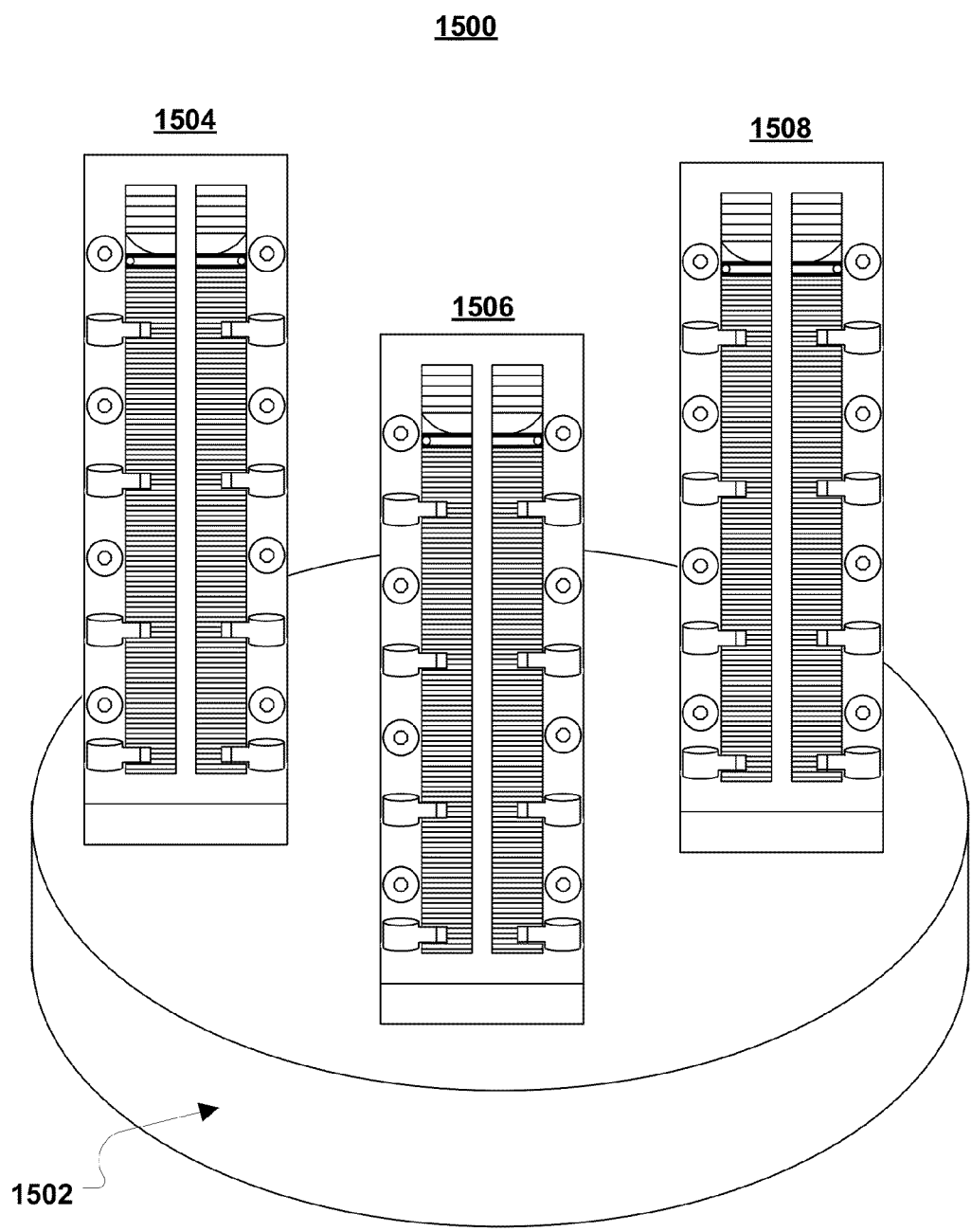
FIG. 15 illustrates a perspective view of a hot box assembly according to an embodiment.

FIG. 15 illustrates a hot box assembly 1500 according to an embodiment. The hot box assembly 1500 may be populated with unsintered fuel cell stacks within assembled channel guides 1504, 1506, and 1508 similar to assembled channel guide 600 described with reference to FIG. 6. The assembled channel guides 1504, 1506, and 1508 may be placed upon a hot box base 1502. A hot box base 1502 may be any structure in the hot box that supports one or more fuel cell stacks. Instead of processing each assembled channel guide 1504, 1506, 1508 and its respective fuel cell stacks separately on a subsystem level, the assembled channel guides 1504, 1506, and 1508 may be inserted into the heating structure (e.g., a furnace) that facilitates stack sintering and conditioning as a group on the hot box base 1502. Specialized gas supplies and stack compression mechanism may be provided before and/or after the sintering and/or conditioning process as described above. The assembled channel guides 1504, 1506, and 1508 may be permanently attached to the fuel cell stack columns. The hot box base 1502 may provide fuel and air flow manifolds to the fuel cell stack columns. In an embodiment, the hot box base 1502 may comprise the fuel cell column cartridge plate 1000 and/or the fuel cell column cartridge plate 1002. In an embodiment the hot box base 1502 with the permanently attached channel guides 1504, 1506, and 1508 may be sintered and/or conditioned in a furnace. A benefit of the group sintering and conditioning on the hot box base 1502 may be that stacks and cells are sintered and conditioned together for uniformity, less handling may be required to assemble the overall power generation system, and the stacks and cells may still be accessible after the sintering and conditioning cycle. Also, an external heating mechanism may be used to attain the temperatures required for stack sintering and/or conditioning. In an embodiment, thermally inductive heating and/or microwave heating may be used to heat the metal interconnects to greater than 950 degrees Celsius while maintaining the temperature at the ceramic channel guides 1504, 1506, and 1508 at less than 850 degrees Celsius. After sintering and conditioning further components (e.g., heat exchanger(s), fuel inlet tube(s), splitter(s), valve(s), etc) necessary for power generation may be added to the assembled channel guides 1504, 1506, and 1508, or optionally components (e.g., fuel bellows 906 and fuel caps 902) may be removed. After sintering and conditioning the hotbox assembly 1500 may be closed and insulated, as shown in FIG. 16.

In an embodiment, unsintered and/or unconditioned fuel cell stack(s) 502 may be placed on hot box base 1502 and the fuel cell stack(s) 502 may be placed in a heating structure that facilitates fuel cell stack(s) 502 sintering and/or conditioning, such as a furnace. The fuel cell stack(s) 502 may be sintered and/or conditioned in the heating structure. During conditioning (e.g., reduction of NiO to Ni in the fuel cell anodes) fuel (e.g., a reducing ambient) may be provided, such as hydrogen or hydrocarbon fuel, to the anode(s) of the fuel cell stack(s) 502 and air may be provided to the cathode(s) of the fuel cell stack(s) 502. During sintering air or inert gas may be provided. In an embodiment, inductive or microwave heating may be used to increase the temperature of the fuel cell stack(s) 502 during sintering and/or conditioning. After sintering and conditioning of the fuel cell stack(s) 502 the hot box base 1502 and fuel cell stack(s) 502 may be removed from the heating and structure and a hot box lid may be placed on the hot box base.

In an alternative embodiment, the fuel cell column cartridge plate 1000 and/or the fuel cell column cartridge plate 1002 may be temporary structures different from the hot box base 1502. The fuel cell column cartridge plate 1000 and/or the fuel cell column cartridge plate 1002 may be removed from the stack before the stack is placed on the hot box base. Alternatively, the fuel cell column cartridge plate 1000 and/or the fuel cell column cartridge plate 1002 may comprise a portion of a hot box base and may be attached to the rest of the hot box base 1502 after sintering and/or conditioning.

Figure 16:
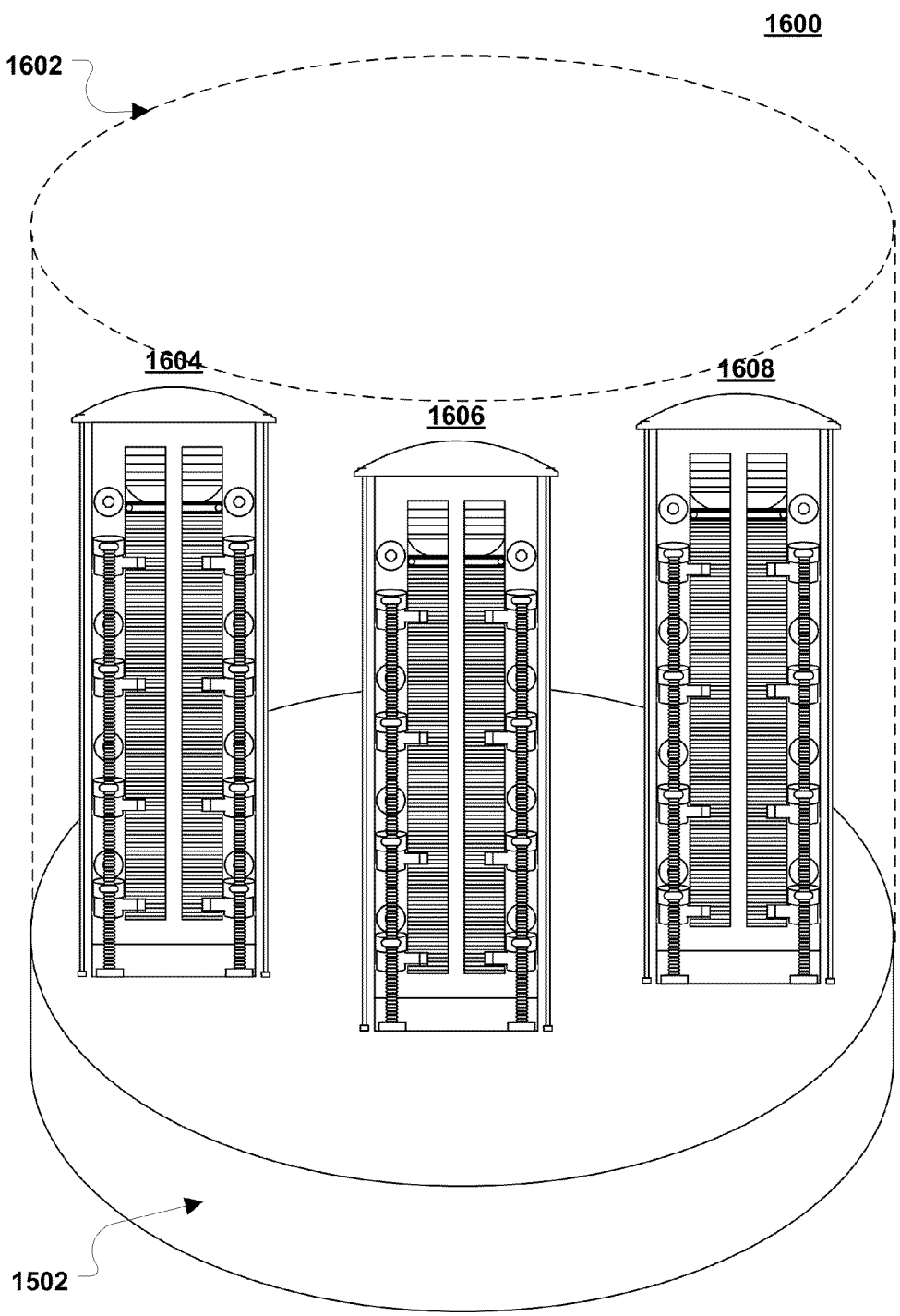
FIG. 16 illustrates a perspective view of a closed hot box assembly according to an embodiment.

FIG. 16 illustrates a closed hot box assembly 1600 according to an embodiment. The closed hot box assembly 1600 may be populated with unsintered and unconditioned fuel cell stacks within assembled channel guides 1604, 1606, and 1608. The assembled channel guides 1604, 1606, and 1608 may be permanently attached to the fuel cell stack columns. The assembled channel guides 1604, 1606, and 1608 may be placed upon a hot box base 1502 and all necessary components, such as internal compression systems, fuel bellows, tie bars, and any additional power generation equipment (e.g., heat exchanger(s), fuel inlet tube(s), splitter(s), valve(s), etc) may be coupled to the assembled channel guides 1604, 1606, and 1608. The closed hot box assembly 1600 may be completed by the addition of a hot box shell 1602 placed over the assembled channel guides 1604, 1606, and 1608 and coupled to the hot box base 1502. The closed hot box assembly 1600 may be entirely closed up before the stacks are heated for sintering and/or conditioning. Temperature and gas supplies to the closed hot box assembly 1600 may then be manipulated to provide the appropriate environment for sintering and conditioning and anode reduction. In an embodiment, the sintering and/or conditioning inside the closed hot box assembly 1600 may be the initial operating step of a power generation system which includes the closed hot box assembly 1600 to generate electricity. In an embodiment, both sintering and conditioning may be performed inside the hot box assembly 1600. In an alternative embodiment, only conditioning may be performed in the hot box assembly 1600, while sintering may be performed in a furnace.

Figure 17A:
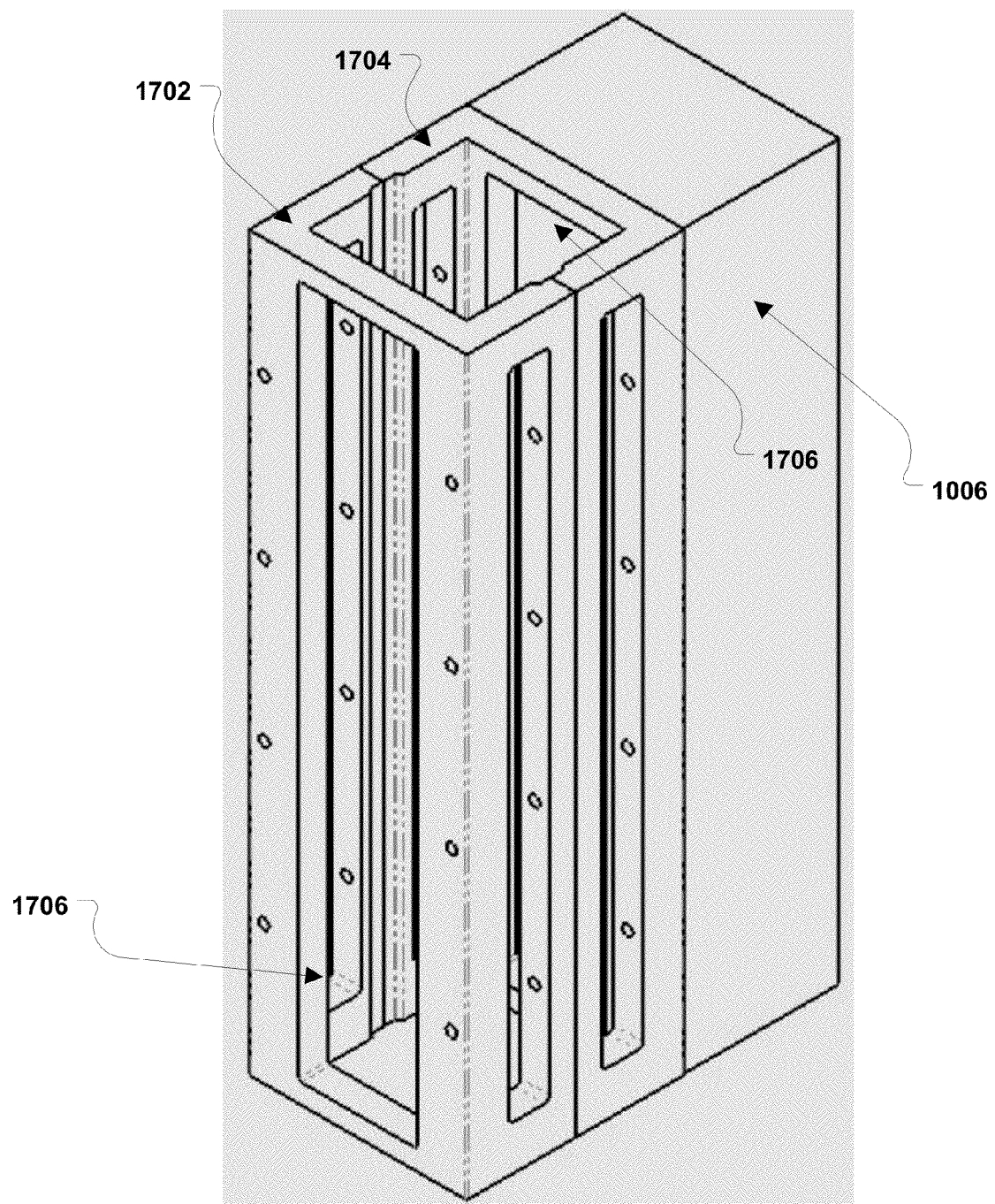
FIG. 17A illustrates a top perspective view of channel guide rails and an air bucket according to an embodiment.
Figure 17B:
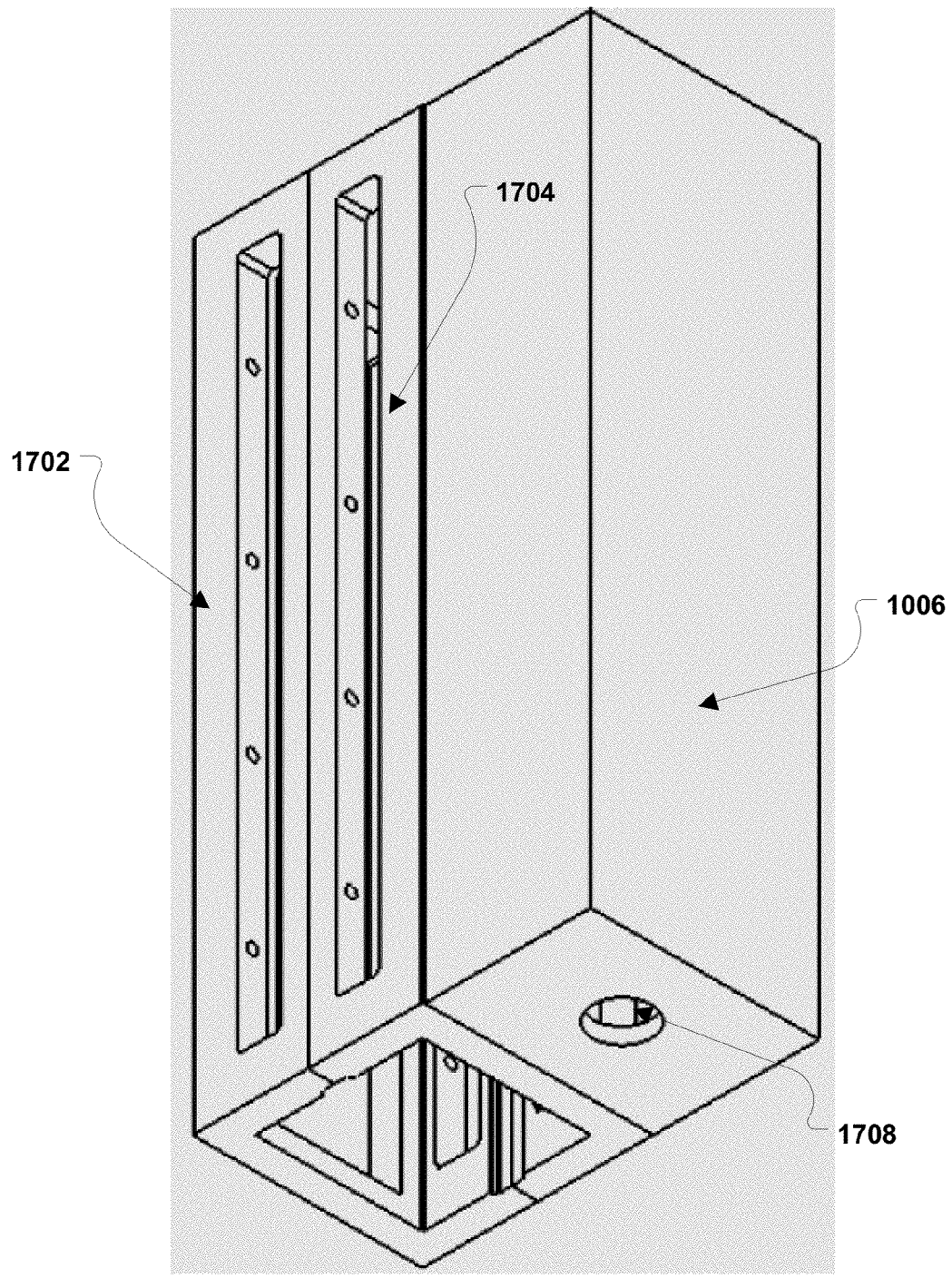
FIG. 17B illustrates a bottom perspective view of channel guide rails and an air bucket according to an embodiment.
Figure 17C:
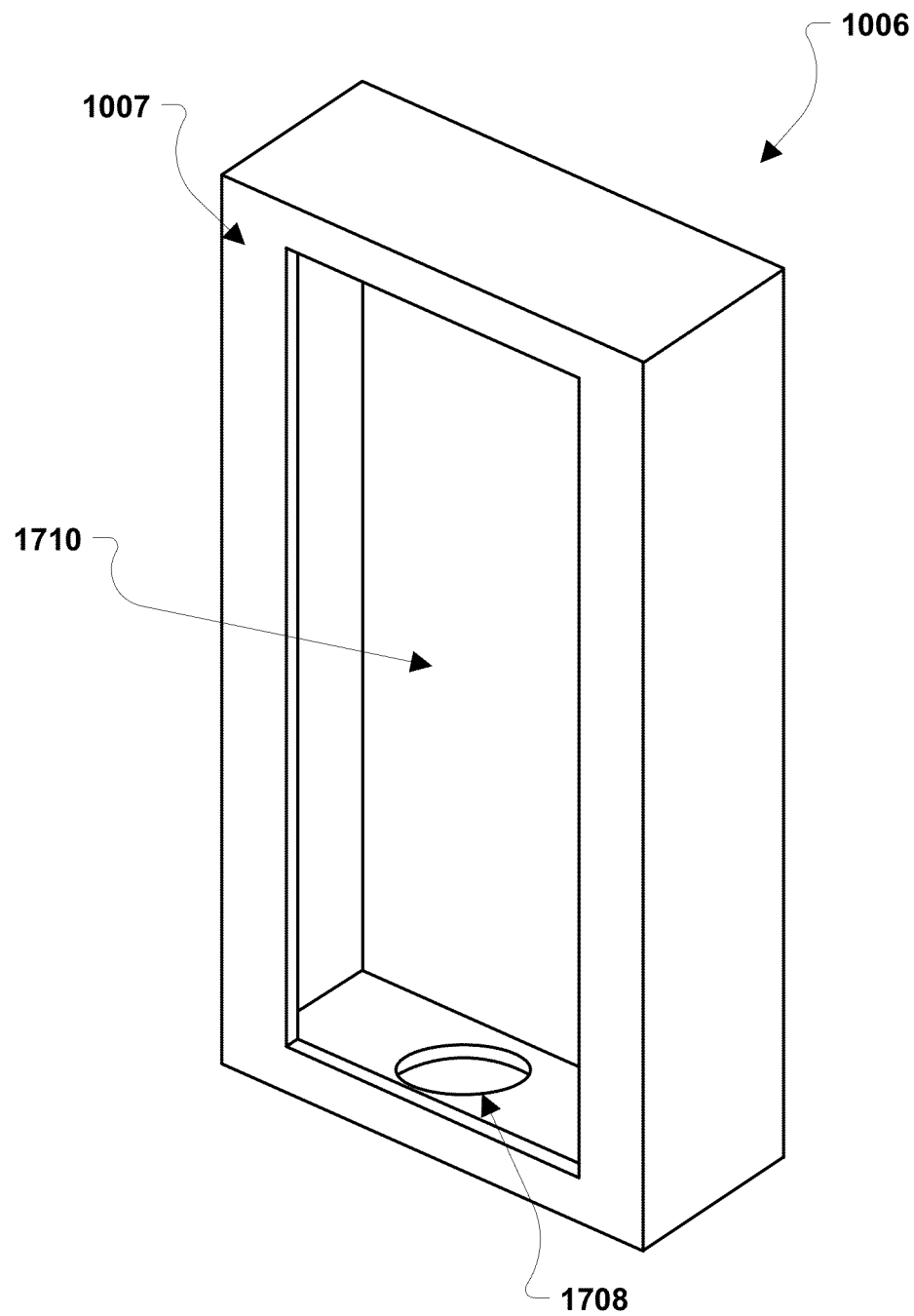
FIG. 17C illustrates a perspective view of an air bucket according to an embodiment.

FIG. 17A illustrates channel guide rails 1702 and 1704 positioned next to the air bucket 1006 according to an embodiment. Channel guide rails 1702 and 1704 may be similar to channel guide rails 102 and 104 discussed above, except that channel guide rails 1702 and 1704 may be configured to create larger cutouts 1706 which lack any vertical rods and are thus configured differently than cutouts 108 in channel guide rails 102 and 104. FIG. 17B illustrates channel guide rails 1702 and 1704 positioned next to the air bucket 1006 shown from a bottom perspective view. In an embodiment, in the bottom of the air bucket 1006 an outlet opening 1708 may function to exhaust air from the air bucket 1006. FIG. 17C illustrates the air bucket 1006 according to an embodiment. The air manifold or "bucket" 1006 may be configured to remove air from a fuel cell stack placed within the channel guide rails 1702 and 1704. Air exhausted from the fuel cell stack may exit pass through cutout 1706 into an opening 1710 in the open surface 1007 of the air bucket 1006 and may pass through the air bucket 1006 to the outlet opening 1708 in the bottom surface of the air bucket 1006. In an embodiment, the outlet opening 1708 may be coupled to conduit 1008 discussed above with reference to FIG. 10A. The air bucket 1006 may be made from any material, such as preferably ceramics, such as alumina, such as 97% pure alumina. Alternatively, the air bucket 1006 may be comprised of less than 97% pure alumina, or more than 97% pure alumina, such as 97% to 98%, 98% to 99%, 99% to 99.5%, 99.5% to 100%, such as about 97%, about 98%, about 99%, or about 100%.

The preceding description of the disclosed embodiments is provided to enable any person skilled in the art to make or use the described embodiment. Various modifications to these embodiments will be readily apparent to those skilled in the art, and the generic principles defined herein may be applied to other embodiments without departing from the scope of the disclosure. Thus, the present invention is not intended to be limited to the embodiments shown herein but is to be accorded the widest scope consistent with the following claims and the principles and novel features disclosed herein.

U.S. application Ser. No. 11/656,563 filed on Jan. 23, 2007 and published as U.S. Patent Publication No. 2007/0196704 A1, U.S. application Ser. No. 12/892,582 filed on Sep. 28, 2010, and U.S. Provisional Application No. 61/511,308 filed on Jul. 25, 2011, are incorporated herein by reference in their entirety.

What is claimed is:

1. A method for sintering and conditioning a fuel cell stack, comprising:
   sintering the fuel cell stack in or on a support structure;
   conditioning the fuel cell stack in or on the support structure;
   connecting a bellow from a fuel tree to a fuel manifold of the fuel cell stack prior to sintering and conditioning the fuel cell stack; and
   removing the bellow prior to enclosing the fuel cell stack on a hot box base with a hot box lid,
   wherein the sintering and the conditioning of the fuel cell stack are performed during the same thermal cycle.

2. The method of claim 1, wherein the support structure comprises a temporary support structure, the method further comprising:
   removing the support structure from the fuel cell stack after conditioning the fuel cell stack and before generating electricity in a hot box using the fuel cell stack.

3. The method of claim 1, wherein the support structure comprises at least a portion of the hot box base which supports the fuel cell stack when the fuel cell stack generates electricity in the hot box.

4. The method of claim 1, wherein the sintering and conditioning of the fuel cell stack are performed while the fuel cell stack is located in a channel guide.

5. The method of claim 1, wherein the sintering is performed in air.

6. The method of claim 5, further comprising:
   changing a temperature of the fuel cell stack following sintering of the fuel cell stack; and
   providing fuel to the fuel cell stack via the bellow and providing air to the fuel cell stack through an air manifold while conditioning the fuel cell stack.

* * * * *